(12) United States Patent
Meng et al.

(10) Patent No.: US 11,491,484 B2
(45) Date of Patent: Nov. 8, 2022

(54) MICROFLUIDIC APPARATUS, METHOD OF DETECTING SUBSTANCE IN MICROFLUIDIC APPARATUS, AND LIGHT EXTRACTION APPARATUS

(71) Applicant: BOE Technology Group Co., Ltd., Beijing (CN)

(72) Inventors: Xianqin Meng, Beijing (CN); Wei Wang, Beijing (CN); Jifeng Tan, Beijing (CN); Xiandong Meng, Beijing (CN); Xiaochuan Chen, Beijing (CN); Jian Gao, Beijing (CN); Pengxia Liang, Beijing (CN); Fangzhou Wang, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 346 days.

(21) Appl. No.: 16/612,937

(22) PCT Filed: Jun. 24, 2019

(86) PCT No.: PCT/CN2019/092521
§ 371 (c)(1),
(2) Date: Nov. 12, 2019

(87) PCT Pub. No.: WO2020/019921
PCT Pub. Date: Jan. 30, 2020

(65) Prior Publication Data
US 2021/0354128 A1 Nov. 18, 2021

(30) Foreign Application Priority Data

Jul. 27, 2018 (CN) .......................... 201810844548.2

(51) Int. Cl.
*B01L 3/00* (2006.01)
*G01N 21/25* (2006.01)
(Continued)

(52) U.S. Cl.
CPC ...... *B01L 3/502715* (2013.01); *G01N 21/255* (2013.01); *G01N 21/31* (2013.01);
(Continued)

(58) Field of Classification Search
CPC .. B01L 3/502715; B01L 3/5027; B01L 3/502; B01L 3/50; B01L 2300/0654;
(Continued)

(56) References Cited

U.S. PATENT DOCUMENTS

2011/0008767 A1 1/2011 Durack et al.
2011/0242670 A1 10/2011 Simmonds
(Continued)

FOREIGN PATENT DOCUMENTS

CN 102073103 A 5/2011
CN 102341693 A 2/2012
(Continued)

OTHER PUBLICATIONS

International Search Report & Written Opinion dated Oct. 8, 2019, regarding PCT/CN2019/092521.
(Continued)

*Primary Examiner* — Christine T Mui
(74) *Attorney, Agent, or Firm* — Intellectual Valley Law, P.C.

(57) ABSTRACT

A microfluidic apparatus is provided. The microfluidic apparatus includes a base substrate; a microfluidic device on the base substrate and including a plurality of micro fluidic channels; a plurality of light sources of different colors respectively emitting light of different wavelength ranges; a light extraction apparatus for extracting light respectively from the plurality of light sources of different colors and a plurality of photosensors. The light extraction apparatus includes a light guide plate having a plurality of light incident portions for respectively receiving light respec-
(Continued)

tively incident from the plurality of light sources of different colors, the plurality of light incident portions being on a side of the light guide plate away from the microfluidic device; and a plurality of light extractors on the light guide plate.

20 Claims, 4 Drawing Sheets

(51) Int. Cl.
*G01N 21/31* (2006.01)
*F21V 8/00* (2006.01)
*G02B 6/00* (2006.01)

(52) U.S. Cl.
CPC ......... *G02B 6/0036* (2013.01); *G02B 6/0068* (2013.01); *B01L 2300/0654* (2013.01); *B01L 2300/0663* (2013.01); *B01L 2300/0816* (2013.01); *B01L 2300/0864* (2013.01); *B01L 2300/165* (2013.01); *G01N 2201/08* (2013.01)

(58) Field of Classification Search
CPC ..... B01L 2300/0663; B01L 2300/0816; B01L 2300/0864; B01L 2300/165; G01N 21/255; G01N 21/31; G01N 2201/08; G02B 6/0068
USPC .......................................................... 436/164
See application file for complete search history.

(56) References Cited

U.S. PATENT DOCUMENTS

| | | | |
|---|---|---|---|
| 2014/0262783 A1* | 9/2014 | Chang | B01L 3/502792 204/603 |
| 2015/0010271 A1 | 1/2015 | Beausoleil et al. | |
| 2017/0023477 A1 | 1/2017 | Yun-Pei et al. | |
| 2017/0138858 A1 | 5/2017 | Astier et al. | |
| 2018/0059103 A1 | 3/2018 | Saxena et al. | |
| 2020/0108387 A1* | 4/2020 | Dong | B01L 3/502715 |

FOREIGN PATENT DOCUMENTS

| | | | | |
|---|---|---|---|---|
| CN | 102472702 A | 5/2012 | | |
| CN | 102954938 A | 3/2013 | | |
| CN | 103999303 A | 8/2014 | | |
| CN | 104498582 A | 4/2015 | | |
| CN | 105928893 A | 9/2016 | | |
| CN | 107607475 A | 1/2018 | | |
| CN | 107607475 B * | 1/2018 | ............. | G01N 21/17 |
| CN | 107810416 A | 3/2018 | | |
| KR | 20120054926 A | 5/2012 | | |
| WO | 2011110084 A1 | 9/2011 | | |
| WO | 2013079619 A1 | 6/2013 | | |

OTHER PUBLICATIONS

First Office Action in the Chinese Patent Application No. 201810844548.2, dated Apr. 23, 2020; English translation attached.

* cited by examiner

# MICROFLUIDIC APPARATUS, METHOD OF DETECTING SUBSTANCE IN MICROFLUIDIC APPARATUS, AND LIGHT EXTRACTION APPARATUS

CROSS-REFERENCE TO RELATED APPLICATION

This application is a national stage application under 35 U.S.C. § 371 of International Application No. PCT/CN2019/092521, filed Jun. 24, 2019, which claims priority to Chinese Patent Application No. 201810844548.2, filed Jul. 27, 2018. Each of the forgoing applications is herein incorporated by reference in its entirety for all purposes.

TECHNICAL FIELD

The present invention relates to display technology and microfluidic technology, more particularly, to a microfluidic apparatus, a method of detecting a substance in a microfluidic apparatus, and a light extraction apparatus.

BACKGROUND

A microfluidics chip is a microchip on which different processes including a biological analysis, a chemical analysis, and a medical analysis are performed. For example, the biological analysis on a microfluidics chip includes sample preparation, dilution, reaction with a substance, separation, and detection the substance. Using a microfluidic chip, a process of detecting a substance can be automatically done in the microfluidic chip.

Because the microfluidic chip technology has many advantages including high analytical accuracy, fast analysis speed, lightness, thinness, low reagent consumption, high integration, high automation, and reusability, the microfluidic chip technology has a great potential market in the fields of biology, chemistry, medicine, etc.

Among the detection technologies used in the microfluidic chips, optical detection is the widest used and most effective technology. Methods used in the optical detection include fluorescence detection, detection using ultraviolet-visible absorption spectroscopy, chemiluminescence detection, bioluminescence detection, and Raman scattering detection. For example, the detection using ultraviolet-visible absorption spectroscopy not only can detect a substance, but also can perform other analyses of the substance, including quantitative analysis, structural analysis, and functional group identification, etc.

SUMMARY

In one aspect, the present invention provides a microfluidic apparatus, comprising a base substrate; a microfluidic device on the base substrate and comprising a plurality of micro fluidic channels; a plurality of light sources of different colors respectively emitting light of different wavelength ranges; a light extraction apparatus for extracting light respectively from the plurality of light sources of different colors and a plurality of photosensors; wherein the light extraction apparatus comprises a light guide plate having a plurality of light incident portions for respectively receiving light respectively incident from the plurality of light sources of different colors, the plurality of light incident portions being on a side of the light guide plate away from the microfluidic device; and a plurality of light extractors on the light guide plate; wherein a respective one of the plurality of light extractors is optically coupled with a respective one of the plurality of light sources of different colors, and is configured to extract light incident from a respective one of the plurality of light incident portions of the light guide plate and totally reflected in the light guide plate, to emit out of the light guide plate, light emitting out of the plurality of light extractors being of different wavelength ranges; orthographic projections of the plurality of light extractors on the light guide plate are spaced apart from each other; an orthographic projection of a respective one of the plurality of micro fluidic channels on the base substrate at least partially overlaps with an orthographic projection of a respective one of the plurality of light extractors on the base substrate; an orthographic projection of a respective one of the plurality of photosensors on the base substrate at least partially overlaps with the orthographic projection of the respective one of the plurality of light extractors on the base substrate; and the respective one of the plurality of photosensors is configured to detect light extracted from the respective one of the plurality of light extractors.

Optionally, the orthographic projections of the plurality of light extractors on the light guide plate are spaced apart from each other along a first direction and along a second direction, the second direction being different from the first direction; and the plurality of light incident portions are spaced apart along the second direction.

Optionally, the respective one of the plurality of light extractors optically coupled to the respective one of the plurality of light sources of different colors is aligned with the respective one of the plurality of light sources of different colors along the first direction.

Optionally, an inter-portion distance between adjacent light incident portions of the plurality of light incident portions is greater than ⅙ of a maximum distance between the respective one of the plurality of light extractors and the respective one of the plurality of light sources of different colors optically coupled together.

Optionally, the plurality of light extractors are on a surface of the light guide plate opposite to a surface of the light guide plate having the plurality of light incident portions.

Optionally, the light guide plate comprises a stacked structure comprising a plurality of light guide medium layers and one or more spacer layers, a respective one of the one or more spacer layers spacing apart adjacent light guide medium layers of the plurality of light guide medium layers; a refractive index of a respective one of the plurality of light guide medium layers is greater than a refractive index of air and greater than a refractive index of the respective one of the one or more spacer layers; and refractive indexes of the plurality of light guide medium layers are different from each other.

Optionally, the plurality of light guide medium layers comprises a first light guide medium layer and a second light guide medium layer; the plurality of light extractors comprises a first light extractor on a side of the first light guide medium layer away from the plurality of light incident portions, the first light extractor being optically coupled with the first light guide medium layer, and configured to extract light incident from a first light source of a first wavelength range and totally reflected in the first light guide medium layer, to emit out of the first light guide medium layer, remaining light extractors of the plurality of light extractors other than the first light extractor are on a side of the second light guide medium layer away from the plurality of light incident portions, the remaining light extractors being optically coupled with the second light guide medium layer, and configured to respectively extract light incident from remaining light sources of wavelength ranges different from the first wavelength range and totally reflected in the second light guide medium layer, to emit out of the second light guide medium layer.

Optionally, the respective one of the plurality of light extractors is optically coupled with a respective one of the light guide medium layers, and is configured to extract light incident from a respective one of the plurality of light sources of different colors and totally reflected in the respective one of the light guide medium layers, to emit out of the respective one of the light guide medium layers; and the respective one of the plurality of light extractors is on a side of the respective one of the light guide medium layers away from the plurality of light incident portions.

Optionally, the plurality of light sources of different colors comprises a first light source emitting light of a first wavelength range, a second light source emitting light of a second wavelength range, and a third light source emitting light of a third wavelength range; the plurality of light guide medium layers comprises a first light guide medium layer optically coupled with the first light source and configured to totally reflect light of the first wavelength range in the first light guide medium layer, a second light guide medium layer optically coupled with the second light source and configured to totally reflect light of the second wavelength range in the second light guide medium layer, and a third light guide medium layer optically coupled with the third light source and configured to totally reflect light of the third wavelength range in the third light guide medium layer; and the plurality of light extractors comprises a first light extractor on a side of the first light guide medium layer away from the plurality of light incident portions and optically coupled with the first light guide medium layer to extract light of the first wavelength range totally reflected in the first light guide medium layer, a second light extractor on a side of the second light guide medium layer away from the plurality of light incident portions and optically coupled with the second light guide medium layer to extract light of the second wavelength range totally reflected in the second light guide medium layer, and a third light extractor on a side of the third light guide medium layer away from the plurality of light incident portions and optically coupled with the third light guide medium layer to extract light of the third wavelength range totally reflected in the third light guide medium layer.

Optionally, the plurality of light incident portions comprises a first light incident portion optically coupled with the first light extractor, spaced apart from the first light extractor along a first direction, and configured to introduce light of the first wavelength range emitted from the first light source into the first light guide medium layer to be totally reflected therein; a second light incident portion optically coupled with the second light extractor, and spaced apart from the second light extractor along the first direction, and configured to introduce light of the second wavelength range emitted from the second light source into the second light guide medium layer to be totally reflected therein; and a third light incident portion optically coupled with the third light extractor, spaced apart from the third light extractor along the first direction, and configured to introduce light of the third wavelength range emitted from the third light source into the third light guide medium layer to be totally reflected therein.

Optionally, the respective one of the plurality of light extractors is selected from a group consisting of a grating structure, diffuser dots, a wave filter, and a micro-mirror.

Optionally, wavelength ranges of light emitted respectively from the plurality of light sources of different colors do not overlap with each other.

Optionally, the microfluidic device further comprises a protective layer on a side of the plurality of micro fluidic channels closer to the light guide plate; a first hydrophobic layer; and a second hydrophobic layer; wherein the first hydrophobic layer and the second hydrophobic layer sandwich the plurality of micro fluidic channels; the first hydrophobic layer is on a side of the protective layer away from the light guide plate; and the second hydrophobic layer is on a side of the base substrate away from the plurality of photosensors.

Optionally, the microfluidic device further comprises a plurality of reaction microchambers respectively in fluid communication with the plurality of micro fluidic channels; and an orthographic projection of a respective one of the plurality of reaction microchambers on the base substrate is between an orthographic projection of a respective one of the plurality of light incident portions on the base substrate and an orthographic projection of a respective one of the plurality of light extractors on the base substrate.

In another aspect, the present invention provides a method of detecting a substance in a microfluidic apparatus, comprising respectively emitting light of different wavelength ranges from a plurality of light sources of different colors into a plurality of light incident portions of a light guide plate; respectively totally reflecting light of different wavelength ranges in the light guide plate; respectively extracting light of different wavelength ranges from the light guide plate respectively using a plurality of light extractors on the light guide plate; respectively irradiating light of different wavelength ranges extracted from the light guide plate onto a plurality of micro fluidic channels, a respective one of the plurality of micro fluidic channels being irradiated by a light of a respective one of the different wavelength ranges; and respectively detecting light respectively transmitting through the plurality of micro fluidic channels by a plurality of photosensors.

In another aspect, the present invention provides a light extraction apparatus, comprising a light guide plate having a plurality of light incident portions for respectively receiving light respectively incident from a plurality of light sources of different colors; and a plurality of light extractors on the light guide plate; wherein a respective one of the plurality of light extractors is optically coupled with a respective one of the plurality of light sources of different colors, and is configured to extract light incident from a respective one of the plurality of light incident portions of the light guide plate and totally reflected in the light guide plate, to emit out of the light guide plate, light emitting out of the plurality of light extractors being of different wavelength ranges; and orthographic projections of the plurality of light extractors on the light guide plate are spaced apart from each other.

Optionally, the orthographic projections of the plurality of light extractors on the light guide plate are spaced apart from each other along a first direction and along a second direction, the second direction being different from the first direction; and the plurality of light incident portions are spaced apart along the second direction.

Optionally, the respective one of the plurality of light extractors optically coupled to the respective one of the plurality of light sources of different colors is aligned with the respective one of the plurality of light sources of different colors along the first direction.

Optionally, an inter-portion distance between adjacent light incident portions of the plurality of light incident portions is greater than 1/6 of a maximum distance between the respective one of the plurality of light extractors and the respective one of the plurality of light sources of different colors optically coupled together.

Optionally, the plurality of light extractors are on a surface of the light guide plate opposite to a surface of the light guide plate having the plurality of light incident portions.

Optionally, the light guide plate comprises a stacked structure comprising a plurality of light guide medium layers and one or more spacer layers, a respective one of the one or more spacer layers spacing apart adjacent light guide medium layers of the plurality of light guide medium layers; a refractive index of a respective one of the plurality of light guide medium layers is greater than a refractive index of air and greater than a refractive index of the respective one of the one or more spacer layers; and refractive indexes of the plurality of light guide medium layers are different from each other.

Optionally, the plurality of light guide medium layers comprises a first light guide medium layer and a second light guide medium layer; the plurality of light extractors comprises a first light extractor on a side of the first light guide medium layer away from the plurality of light incident portions, the first light extractor being optically coupled with the first light guide medium layer, and configured to extract light incident from a first light source of a first wavelength range and totally reflected in the first light guide medium layer, to emit out of the first light guide medium layer; and remaining light extractors of the plurality of light extractors other than the first light extractor are on a side of the second light guide medium layer away from the plurality of light incident portions, the remaining light extractors being optically coupled with the second light guide medium layer, and configured to respectively extract light incident from remaining light sources of wavelength ranges different from the first wavelength range and totally reflected in the second light guide medium layer, to emit out of the second light guide medium layer.

Optionally, the respective one of the plurality of light extractors is optically coupled with a respective one of the light guide medium layers, and is configured to extract light incident from a respective one of the plurality of light sources of different colors and totally reflected in the respective one of the light guide medium layers, to emit out of the respective one of the light guide medium layers; and the respective one of the plurality of light extractors is on a side of the respective one of the light guide medium layers away from the plurality of light incident portions.

Optionally, the plurality of light sources of different colors comprises a first light source emitting light of a first wavelength range, a second light source emitting light of a second wavelength range, and a third light source emitting light of a third wavelength range; the plurality of light guide medium layers comprises a first light guide medium layer optically coupled with the first light source and configured to totally reflect light of the first wavelength range in the first light guide medium layer, a second light guide medium layer optically coupled with the second light source and configured to totally reflect light of the second wavelength range in the second light guide medium layer, and a third light guide medium layer optically coupled with the third light source and configured to totally reflect light of the third wavelength range in the third light guide medium layer; and the plurality of light extractors comprises a first light extractor on a side of the first light guide medium layer away from the plurality of light incident portions and optically coupled with the first light guide medium layer to extract light of the first wavelength range totally reflected in the first light guide medium layer, a second light extractor on a side of the second light guide medium layer away from the plurality of light incident portions and optically coupled with the second light guide medium layer to extract light of the second wavelength range totally reflected in the second light guide medium layer, and a third light extractor on a side of the third light guide medium layer away from the plurality of light incident portions and optically coupled with the third light guide medium layer to extract light of the third wavelength range totally reflected in the third light guide medium layer.

Optionally, the plurality of light incident portions comprises a first light incident portion optically coupled with the first light extractor, spaced apart from the first light extractor along a first direction, and configured to introduce light of the first wavelength range emitted from the first light source into the first light guide medium layer to be totally reflected therein; a second light incident portion optically coupled with the second light extractor, and spaced apart from the second light extractor along the first direction, and configured to introduce light of the second wavelength range emitted from the second light source into the second light guide medium layer to be totally reflected therein; and a third light incident portion optically coupled with the third light extractor, spaced apart from the third light extractor along the first direction, and configured to introduce light of the third wavelength range emitted from the third light source into the third light guide medium layer to be totally reflected therein.

Optionally, the respective one of the plurality of light extractors is selected from a group consisting of a grating structure, diffuser dots, a wave filter, and a micro-mirror.

Optionally, wavelength ranges of light emitted respectively from the plurality of light sources of different colors do not overlap with each other.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1A:
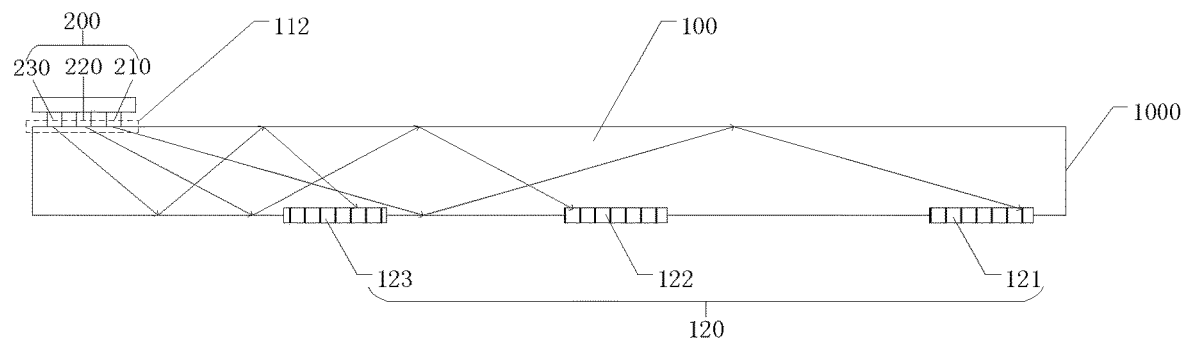
FIG. 1A is a cross-sectional view of a light extraction apparatus in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a microfluidic apparatus, a method of detecting a substance in a microfluidic apparatus, and a light extraction apparatus that substantially obviate one or more of the problems due to limitations and disadvantages of the related art. In one aspect, the present disclosure provides a microfluidic apparatus. In some embodiments, the microfluidic apparatus includes a base substrate, a microfluidic device on the base substrate and including a plurality of micro fluidic channels, a light extraction apparatus for extracting light respectively from the plurality of light sources of different colors; a plurality of light sources of different colors respectively emitting light of different wavelength ranges; and a plurality of photosensor. Optionally, the light extraction apparatus includes a light guide plate having a plurality of light incident portions for respectively receiving light respectively incident from the plurality of light sources of different colors, and a plurality of light extractors on the light guide plate. In one example, the plurality of light incident portions are on a side of the light guide plate away from the microfluidic device. Optionally, a respective one of the plurality of light extractors is optically coupled with a respective one of the plurality of light sources of different colors. Optionally, the respective one of the plurality of light extractors is configured to extract light incident from a respective one of the plurality of light incident portions of the light guide plate and totally reflected in the light guide plate, to emit out of the light guide plate. Optionally, light emitting out of the plurality of light extractors is of different wavelength ranges. Optionally, orthographic projections of the plurality of light extractors on the light guide plate are spaced apart from each other. Optionally, an orthographic projection of a respective one of the plurality of microfluidic channels on the base substrate at least partially overlaps with an orthographic projection of a respective one of the plurality of light extractors on the base substrate. Optionally, an orthographic projection of a respective one of the plurality of photosensors on the base substrate at least partially overlaps with the orthographic projection of the respective one of the plurality of light extractors on the base substrate. Optionally, the respective one of the plurality of photosensors is configured to detect light extracted from the respective one of the plurality of light extractors. The present microfluidic apparatus may be used to perform biological analyses, chemical analyses, or medical analyses, using light of different wavelength ranges to detect multiple substances simultaneously.

In another aspect, the present disclosure provides a light extraction apparatus. The light extraction apparatus includes a light guide plate having a plurality of light incident portions for respectively receiving light respectively incident from a plurality of light sources of different colors; and a plurality of light extractors on the light guide plate. Optionally, a respective one of the plurality of light extractors is optically coupled with a respective one of the plurality of light sources of different colors. Optionally, the respective one of the plurality of light extractors is configured to extract light incident from a respective one of the plurality of light incident portions of the light guide plate and totally reflected in the light guide plate, to emit out of the light guide plate. Optionally, light emitting out of the plurality of light extractors is of different wavelength ranges. Optionally, orthographic projections of the plurality of light extractors on the light guide plate are spaced apart from each other. For example, a respective one of the plurality of light extractors can extract light of a respective wavelength range to detect a substances in a respective one of the plurality of micro fluidic channels. The microfluidic apparatus having the light extraction apparatus herein can detect multiple substances at the same time. And the microfluidic apparatus having the light extraction apparatus can effectively, rapidly, and accurately detect multiple substances.

FIG. 1A is a cross-sectional view of a light extraction apparatus in some embodiments according to the present disclosure. Referring to FIG. 1A, in some embodiments, the light extraction apparatus 1000 includes a light guide plate 100 and a plurality of light extractors 120. Optionally, the light guide plate 100 includes a plurality of light incident portions 112 for respectively receiving light respectively incident from a plurality of light sources 200 of different colors. Optionally, orthographic projections of the plurality of light extractors 120 on the light guide plate 100 are spaced apart from each other.

In some embodiments, a respective one of the plurality of light extractors 120 is optically coupled with a respective one of the plurality of light sources 200 of different colors. Optionally, the respective one of the plurality of light extractors 120 is configured to extract light incident from a respective one of the plurality of light incident portions 112 of the light guide plate 100 and totally reflected in the light guide plate 100, to emit out of the light guide plate 100. Optionally, light emitting out of the plurality of light extractors 120 is of different wavelength ranges. Optionally, a respective one of the plurality of light extractors 120 corresponds to a respective one of the plurality of light incident portions 112.

In some embodiments, the plurality of light extractors 120 respectively extract light of different wavelength ranges. Light of different wavelength ranges can be used to respectively detect different substance at the same time, to allow the microfluidic apparatus having the light extraction apparatus 1000 herein to effectively, rapidly, and accurately detect multiple substances. Moreover, the plurality of light extractors 120 can be placed on a same light guide plate 100, which is good for the miniaturization and integration of the microfluidic apparatus.

Referring to FIG. 1A, in some embodiments, the plurality of light incident portions 112 are configured to allow light from plurality of light sources 200 of different colors respectively incident into the light guide plate 100. Optionally, the plurality of light sources 200 of different colors includes a first light source 210, a second light source 220, and a third light source 230. Optionally, the first light source 210 emits light of a first wavelength range. The second light source 220 emits light of a second wavelength range. The third light source 230 emits light of a third wavelength range.

In some embodiments, the light of the first wavelength range from the first light source 210 is incident into the light guide plate 100 through a respective one of the plurality of light incident portions 112. The light of the second wavelength range from the second light source 220 is incident into the light guide plate 100 through a respective one of the plurality of light incident portions 112. The light of the third wavelength range from the third light source 230 is incident into the light guide plate 100 through a respective one of the plurality of light incident portions 112.

In some embodiments, the light guide plate 100 is configured to totally reflect the light of different wavelength ranges incident into the light guide plate 100.

In some embodiments, orthographic projections of the plurality of light extractors 120 on the light guide plate 100 are spaced apart from each other. Optionally, a respective one of the plurality of light extractors 120 is optically coupled with a respective one of the plurality of light sources 200 of different colors. Optionally, the respective one of the plurality of light extractors 120 is configured to extract light incident from a respective one of the plurality of light incident portions 112 of the light guide plate 100 and totally reflected in the light guide plate 100, to emit out of the light guide plate 100. Optionally, light emitting out of the plurality of light extractors 120 is of different wavelength ranges.

Optionally, the plurality of light extractors 120 includes a first light extractor 121, a second light extractor 122, and a third light extractor 123. In one example, the first light extractor 121 is configured to extract light incident from the first light source 210 of the first wavelength range and totally reflected in the light guide plate 100, to emit out of the light guide plate 100. In another example, the second light extractor 122 is configured to extract light incident from the second light source 220 of the second wavelength range and totally reflected in the light guide plate 100, to emit out of the light guide plate 100. In another example, the third light extractor 123 is configured to extract light incident from the third light source 230 of the third wavelength range and totally reflected in the light guide plate 100, to emit out of the light guide plate 100.

Optionally, the plurality of light incident portions 112 area portion of the light guide plate 100. Optionally, the plurality of light incident portions 112 are optical structures allowing light incident into the light guide plate 100. For example, the plurality of light incident portions 112 are a grating structure.

Referring to FIG. 1A, in order to clearly illustrate the light paths in the light extraction apparatus, the cross-sectional view of the light extraction apparatus 1000 shows the light paths of light emitted from the first light source 210, the second light source 220, and the third light source 230 at the same time. However, in practice, the light paths of light emitted from the first light source 210, the second light source 220, and the third light source 230 do not have to necessarily exist in a same cross-sectional plane of the light extraction apparatus. Optionally, the light paths of light emitted from the first light source 210, the second light source 220, and the third light source 230 exist in different cross-sectional planes of the light extraction apparatus 1000.

In some embodiments, the light extraction apparatus 1000 can provide light of a respective wavelength range for a respective one of the plurality of light extractors 120. For example, the light extraction apparatus 1000 provides a respective one of the plurality of light extractors 120 with red light of a wavelength rang of approximately 620 nm to approximately 750 nm, e.g. approximately 620 nm to approximately 650 nm, approximately 650 nm to approximately 700 nm, and approximately 700 nm to approximately 750 nm. The light extraction apparatus 1000 provides a respective one of the plurality of light extractors 120 with green light of a wavelength rang of approximately 500 nm to approximately 570 nm, e.g. approximately 500 nm to approximately 520 am, approximately 520 nm to approximately 540 nm, approximately 540 nm to approximately 560 nm, and approximately 560 am to approximately 570 nm, the light extraction apparatus 1000 provides a respective one of the plurality of light extractors 120 with blue light of a wavelength rang of approximately 476 nm to approximately 495 nm, e.g. approximately 476 nm to approximately 480 nm, approximately 480 nm to approximately 485 nm, approximately 485 nm to approximately 490 nm, and approximately 490 nm to approximately 495 nm.

Optionally, the plurality of light extractors 120 respectively extracts light of different wavelength ranges. Light of different wavelength ranges can be used to respectively detect different substance at the same time, to allow the microfluidic apparatus having the light extraction apparatus 1000 herein to effectively, rapidly, and accurately detect multiple substances. For example, a respective one of a plurality of photosensors detects a first light intensity of a light without transmitting through a substance. And the respective one of the plurality of photosensors detects a second light intensity of the light after it transmits through the substance. A ratio of the first light intensity to the second light intensity can be calculated, and the light absorbance of the substance can be obtained. So, the microfluidic apparatus having the light extraction apparatus 1000 can effectively, rapidly, and accurately detect multiple substances. Moreover, the plurality of light extractors 120 is on a same light guide plate 100, which is good for the miniaturization and integration of the microfluidic apparatus.

Optionally, a respective one the different wavelength ranges has a difference between an upper limit and a lower limit of the wavelength range. Optionally, the difference between the upper limit and the lower limit of the respective one the different wavelength ranges do not exceed 150 nm. Optionally, light of different wavelength ranges includes visible light, ultraviolet light, etc. For example, the light of different wavelength ranges include ultraviolet light having a wavelength range of approximately 220 nm-approximately 280 nu, e.g. approximately 220 nm-approximately 240 nm, approximately 240 nm-approximately 260 nm, and approximately 260 nm-approximately 280 nm.

Optionally, by designing a refractive index of the light guide plate 100, and an incident angle of the light of different wavelength ranges to the light guide plate 100, the light guide plate 100 can totally reflect the light of different wavelength ranges.

Optionally, different wavelength ranges of light emitted respectively from the plurality of light sources 200 of different colors do not overlap with each other. Optionally, different wavelength ranges include the first wavelength range, the second wavelength range, and the third wavelength range. Optionally, wavelengths within the first wavelength range are greater than wavelengths within second wavelength range. Wavelengths within the second wavelength range are greater than wavelengths within third wavelength range.

For example, a red light emitted from a respective one of light source 200 of different colors has a wavelength rang of approximately 620 nm to approximately 750 nm, e.g. approximately 620 nm to approximately 650 nm, approximately 650 un to approximately 700 nm, and approximately 700 nm to approximately 750 nm. A green light emitted from a respective one of light source 200 of different colors has a wavelength rang of approximately 500 nm to approximately 570 nm, e.g. approximately 500 nm to approximately 520 urn, approximately 520 nm to approximately 540 nm, approximately 540 nm to approximately 560 nm, and approximately 560 nm to approximately 570 nm. A blue light emitted from a respective one of light source 200 of different colors has a wavelength rang of approximately 476 nm to approximately 495 nm, e.g. approximately 476 nm to approximately 480 nm, approximately 480 nm to approximately 485 nm, approximately 485 un to approximately 490 nm, and approximately 490 nm to approximately 495 nm.

Figure 1B:
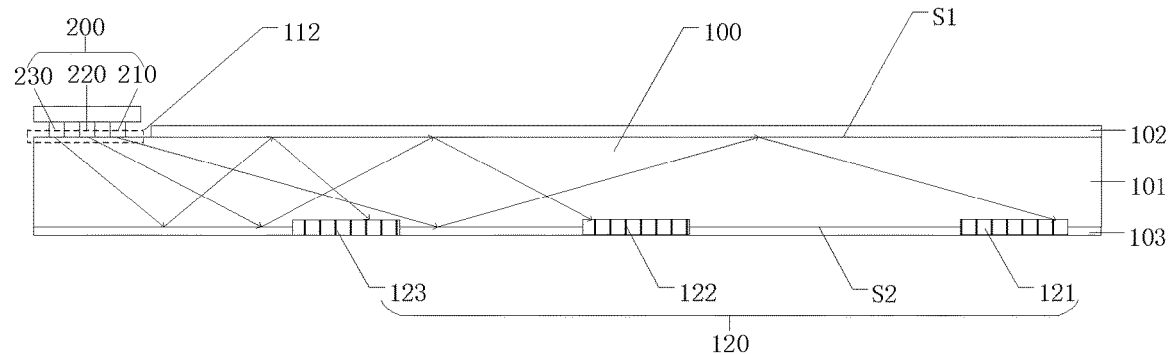
FIG. 1B is a cross-sectional view of a light extraction apparatus in some embodiments according to the present disclosure.

FIG. 1B is a cross-sectional view of a light extraction apparatus in some embodiments according to the present disclosure. Referring to FIG. 1B, in some embodiments, the light guide plate 100 include a light guide medium layer 101. The light guide medium layer 101 has a first surface S1 and a second surface S2 facing the first surface S1. After a light is incident into the light guide plate 100, the light is totally reflected by the first surface S1, as well as totally reflected by the second surface S2. Optionally, the first surface S1 and the second surface S2 are parallel to each other.

Assuming a refractive index of the light guide medium layer 101 is n1, a refractive index of a first medium 102 on a first surface S1 of the light guide medium layer 101 away from the second surface S2 is n0. A refractive index of a second medium 103 on a second surface S2 of the light guide medium layer 101 away from the first surface S2 is n2. Optionally, n2>n0. A first total reflective angle θ0 of the first surface S1 and a second total reflective angle θ1 of the second surface S2 are as follows:

$$\theta 0 = \arcsin(n0/n1)$$

$$\theta 1 = \arcsin(n2/n1)$$

When a light has an incident angle θ on the light guide medium layer 101 satisfying a requirement that θ0<θ1<θ<90, the light will be totally reflected by the first surface S1 and the second surface S2 of the light guide medium layer 101.

When a light has the incident angle θ on the light guide medium layer 101 satisfying a requirement that θ0<θ<θ1, the light will not be totally reflected by the second surface S2 of light guide medium layer 101, and the light will not be totally reflected by the light guide medium layer 101.

When a light has the incident angle θ on the light guide medium layer 101 satisfying a requirement that θ0<θ<θ1, the light will be totally reflected by neither the first surface 1 nor the second surface S2 of the light guide medium layer 101, and the light will not be totally reflected by the light guide medium layer 101.

In some embodiments, a light incident into the light guide medium layer 101 has an incident angle θ, if the incident angle θ meets the requirement of total reflection, the light will be total reflected by the light guide plate 100. Optionally, the plurality of light extractors 120 may destroy the requirement of total reflection, the light will be extracted out of the plurality of light extractors 120. When the light irradiates on the plurality of light extractors 120, diffused reflection occurs, and a diffused reflected light transmits along various directions.

A characteristic equation of the critical state is as follows:

$$2\pi \times h \times n1 \times \cos\theta = \lambda \times (m\pi + \varphi 0 + \varphi 1) \quad (1)$$

wherein, m is a constant, φ0 and φ1 are phase changes during total reflection, λ is a wavelength of the incident light, h is the thickness of a light guide medium layer of the light guide plate. If the wavelength λ of the incident light changes, the incident angle θ should be adjusted to satisfy the equation (1), to allow the light guide plate 100 to totally reflect the incident light.

When n1>n2>n0, an incident angle θ of a light of a wavelength c irradiates on the light guide plate 100 is θc, the incident light of a wavelength λc is at a critical angle.

Optionally, the incident angle θ of the light of the wavelength λc should be greater than the critical angle θc of the total reflection, e.g. θ>θc, to allow the light of the wavelength λc to be totally reflected in the light guide plate 100.

Optionally, the incident angle θ of the light of the wavelength λc equals to θc, e.g. θ=θc, the light guide plate 100 turns from a total reflection mode into a diffused reflection mode. Therefore, the critical wavelength λc of the incident light is as follows:

$$\lambda c = 2\pi \times h \times n1 \times \cos\theta c/(m\pi + \varphi 0 + \varphi 1) \quad (2)$$

The first surface S1 and the second surface S2 of the light guide plate 100 are total reflection surfaces, therefore, no matter the incident light is Transverse Electric (TE) wave mode or Transverse Magnetic (TM) wave mode, φ1=0. (Transverse Electric (TE) wave mode includes an orthogonal polarized wave mode or horizontally polarized wave mode; Transverse Magnetic (TM) wave mode includes a parallel polarized wave mode or vertically polarized wave mode). A critical wavelength λc of the incident light is as follows:

$$\lambda c = 2\pi \times h \times \sqrt{(n1^2 - n2^2)}/(m\pi + \varphi 0) \quad (3)$$

The critical wavelength λc is determined by n1, n0, n2, and h. The critical wavelength λc changes according to the thickness of the light guide medium layer 101 of the light guide plate 100. For example, as the thickness of the light guide medium layer increases, the critical wavelength λc decreases. The critical wavelength λc has different values corresponding to different modes of the light guide plate 100. The higher the order of the mode, the shorter the critical wavelength λc is.

According to the equation (3), the constant $m = [2\pi \times h \times \sqrt{(n1^2 - n2^2)} - \varphi 0]/\pi$.

Wherein, the thickness h of the light guide medium layer 101 of the light guide plate 100 increases, h increases, difference between n1 and n2 increases, the amount of modes in the light guide plate 100 increases. Optionally, m=1, e.g. the light guide plate 100 is a single mode light guide plate. In the single mode light guide plate, the thickness h of the light guide medium layer 101 of the light guide plate 100 reaches a minimum value, e. g. the light guide medium layer 101 is the thinnest.

Optionally, the thickness h of the light guide medium layer 101 of the light guide plate and other parameters of the light guide plate can be calculated using wave optics software including FDTD solutions from website of www.lumerical.com and COMSOL.

In some embodiments, the first medium 102 of the light guide plate 100 is air. The second medium 103 of the light guide plate 100 is a protective layer or a hydrophobic layer. Optionally, the refractive index of the light guide medium layer 101 is greater than the refractive index of air, and greater than the refractive index of the protective layer or of the hydrophobic layer.

Various appropriate materials may be used for making the light guide medium layer 101. Example of materials suitable for making the light guide medium layer 101 include, but are not limited to, transparent materials. Optionally, the materials suitable for making the light guide medium layer 101 includes Indium tin oxide (ITO), silicon oxide, silicon nitride, glass, or resin.

In some embodiments, the plurality of light extractors 120 includes an ultraviolet light extractor extracting ultraviolet light of a wavelength range of 220 nm-280 nm, and a red light extractor extracting red light of a wavelength range of 620 nm-750 nm. Optionally, the ultraviolet light of the wavelength range of 220 nm-280 nm is used for detecting the total amount of nitrogen in a substance. Optionally, the red light of the wavelength range of 620 nm-750 nm is used for detecting the total amount of phosphorus in a substance. For example, the light extraction apparatus 1000 can detect the total amount of nitrogen and the total amount of phosphorus at the same time, which may increase the working efficiency of the light extraction apparatus.

Referring to FIG. 1A, in some embodiments, the plurality of light extractors 120 are on a surface of the light guide plate 100 opposite to a surface of the light guide plate 100 having the plurality of light incident portions 112. Optionally, the two surfaces of the light guide plate 100 refers to the two surfaces having relatively larger areas among all the surfaces of the light guide plate 100.

In some embodiments, the respective one of the plurality of light extractors 120 is selected from a group consisting of a grating structure, diffuser dots, a wave filter, and a micromirror. For example, the plurality of light extractors 120 interrupt the total reflection condition, and extract light of different wavelength ranges out of the light guide plate 100.

In one example, the plurality of light extractors 120 have the grating structure. A period of the grating structure is determined by parameters including a wavelength range of a light, an incident angle of the light, a refractive index of a light guide medium layer 101, a refractive index of a grating structure, an outgoing angle of the light. In one example, a duty cycle of the gating structure is 0.5. In another example, the duty cycle of the grating structure deviates from 0.5. As used herein, the term "duty cycle of the grating structure" refers to a ratio of a ridge width to a width of the whole grating structure.

For example, the grating structure is a transmissive grating structure. A period of the grating structure can be determined by the following equation:

$$ni \times \sin\theta i - nd \times \sin\theta d = m \times \lambda / \Lambda (m=0,+/-1,2,\ldots) \quad (4)$$

wherein, ni is a refractive index rate of an incident space, $\theta i$ is an incident angle of an incident light, m is diffraction order, $\Lambda$ is a period of the grating structure, $\lambda$ is the wavelength of the incident light, $\theta d$ is an angle between a direction of the diffracted light and the normal direction of an incident surface, nd is a refractive index of an existing medium and an equivalent refractive index of the grating structure.

Basing on the equation (4), when the incident angle $\theta i$ of the incident light is an angle that satisfies total reflection condition. The outgoing angle $\theta d$ of the diffracted light is an angle that is substantially perpendicular to the grating structure. Accordingly, the period of the grating structure can be calculated via the equation that $\Lambda = m \times \lambda / (ni \times \sin\theta i)$. Optionally, the outgoing angle can be accurately designed by diffractive optical software.

In another example, the plurality of light extractors 120 are diffuser dots. In one example, the size of the diffuser dots and the distance between two adjacent diffuser dots can be determined based on the shapes or morphology of the droplets of a substance to be detected. In another example, the diffuser dots are blind spots on the light guide plate 100.

In another example, the plurality of light extractors 120 is configured to respectively extract light of different wavelength ranges out of the light guide plate 100 in a direction perpendicular to the light guide plate 100, which may improve the detection accuracy of the light extraction apparatus.

Figure 2:
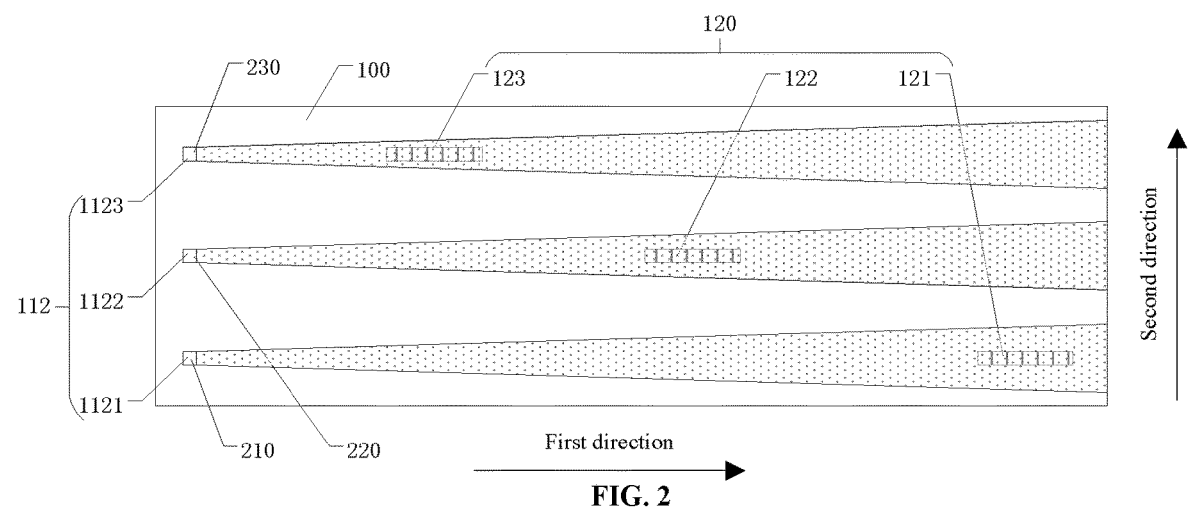
FIG. 2 is a plan view of a light extraction apparatus in some embodiments according to the present disclosure.

FIG. 2 is a plan view of a light extraction apparatus in some embodiments according to the present disclosure.

Referring to FIG. 2, in some embodiments, the plurality of light extractors 120 on the light guide plate 100 are spaced apart from each other along a first direction and along a second direction. Optionally, the orthographic projections of the plurality of light extractors 120 on the light guide plate 100 are spaced apart from each other along the first direction and along the second direction. In one example, the orthographic projections of the plurality of light extractors 120 on the light guide plate 100 are spaced apart from each other along the first direction. In another example, the orthographic projections of the plurality of light extractors 120 on the light guide plate 100 are spaced apart from each other along the second direction. In another example, the orthographic projections of the plurality of light extractors 120 on the light guide plate 100 are spaced apart from each other along both the first direction and along the second direction.

Optionally, the second direction is different from the first direction. Optionally, the first direction is perpendicular to the second direction.

In some embodiments, the plurality of light incident portions 112 are spaced apart along the second direction. Optionally, the orthographic projection of the plurality of light incident portions 112 on the light guide plate 100 are spaced apart from each other along the second direction. Optionally, the respective one of the plurality of light incident portions 112 is optically coupled to the respective one of the plurality of light sources 200 of different colors. A light of a respective wavelength range emitting from a respective one of the plurality of light sources 200 of different colors is incident into a respective one of the plurality of light incident portions 112. And the light of the respective wavelength range incident in the respective one of the plurality of light incident portions 112 is extracted by a respective one of the plurality of light extractors 120. Therefore, the respective one of the plurality of light extractors 120 is optically coupled to the respective one of the plurality of light sources 200 of different colors. The respective one of the plurality of light extractors 120 can only extract light of the respective wavelength range, which may avoid disturbance of light of wavelength ranges different from the respective wavelength range.

Optionally, light of different wavelength ranges incident to the light guide plate 100 can transmit in a same light guide medium, as far as light of a respective wavelength range incident into a respective one of the plurality of light incident portions 112 will be extracted out of a respective one of the plurality of light extractors 120.

In some embodiments, the plane of the light guide plate 100 include a first direction and a second direction. Optionally, the first direction is perpendicular to the second direction. Optionally, a respective one of the plurality of the light incident portion 112 is configured to allow light of a respective wavelength range to transmit along the first direction in the light guide plate 100.

In some embodiments, the plurality of light sources 200 of different colors includes the first light source 210, the second light source 220, and the third light source 230. The first light source 210 emits light of a first wavelength range. The second light source 220 emits light of a second wavelength range. The third light source 230 emits light of a third wavelength range.

In some embodiments, the plurality of light incident portions 112 includes a first light incident portion 1121, a second light incident portion 1122, and a third light incident portion 1123. In one example, the light of the first wavelength range emitted from the first light source 210 is incident on the first light incident portion 1121 into the light guide plate 100, and transmits along the first direction in the light guide plate 100. In another example, the light of the second wavelength range emitted from the second light source 220 is incident on the second light incident portion 1122 into the light guide plate 100, and transmits along the first direction in the light guide plate 100. In another example, the light of the third wavelength range emitted from the third light source 230 is incident on the third light incident portion 1123 into the light guide plate 100, and transmits along the first direction on the light guide plate 100.

In some embodiments, the orthographic projections of the plurality of light incident portions 112 are spaced apart along the second direction, which ensures that within a certain distance, light of different wavelength ranges doesn't overlap with each other. A respective one of the plurality of light incident portions 112 is optical coupled to a respective one of the plurality of light extractors 120 extracting light of a respective wavelength range, which may avoid the crosstalk between light of different wavelength ranges.

In some embodiments, the respective one of the plurality of light extractors 120 optically coupled to the respective one of the plurality of light sources 200 of different colors is aligned with the respective one of the plurality of light sources of different colors along the first direction. Optionally, the respective one of the plurality of light extractors 120 optically coupled to the respective one of the plurality of light sources 200 of different colors is aligned with the respective one of the plurality of light incident portions 112 along the first direction.

In some embodiments, an inter-portion distance between adjacent light incident portions of the plurality of light incident portions 112 is greater than ⅙ of a maximum distance between the respective one of the plurality of light extractors 120 and the respective one of the plurality of light sources 200 of different colors optically coupled together. Optionally, the inter-portion distance between adjacent light incident portions of the plurality of light incident portions 112 is greater than ⅙ of a maximum distance between the respective one of the plurality of light extractors 120 and the respective one of the plurality of light incident portions 112 optically coupled together.

It is difficult for the plurality of light sources 200 of different colors to emit perfectly collimated light. In one example, the degree of collimation of the collimated light is +/−5°. During a light transmission process, light of different wavelength ranges respective emitted from the plurality of light source 200 of different colors will overlap with each other after the light of different wavelength ranges transmit for a certain distance. By keeping the inter-portion distance between adjacent light incident portions of the plurality of light incident portions 112 greater than ⅙ of the maximum distance between the respective one of the plurality of light extractors 120 and the respective one of the plurality of light sources 200 of different colors optically coupled together, it is ensured that the light of different wavelength ranges emitted from the plurality of light source 200 of different colors will not overlap with each other within a certain distance.

For example, the plurality of light source 200 of different colors are collimated by a plurality of parabolic collimators with a diameter of 2 mm. The degree of collimation of the collimated light is +/−5°. The inter-portion distance between adjacent light incident portions of the plurality of light incident portions 112 is 8 mm. The maximum distance between the respective one of the plurality of light extractors 120 and the respective one of the plurality of light sources 200 of different colors optically coupled together is 40 mm. Optionally, the maximum distance between the respective one of the plurality of light extractors 120 and the respective one of the plurality of light incident portions 112 optically coupled together is 40 mm.

Figure 3:
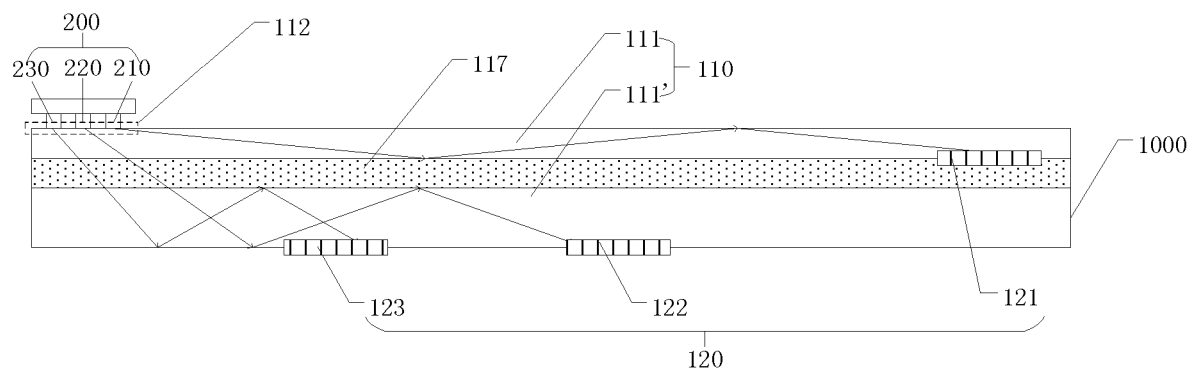
FIG. 3 is a cross-sectional view of a light extraction apparatus in some embodiments according to the present disclosure.

FIG. 3 is a cross-sectional view of a light extraction apparatus in some embodiments according to the present disclosure. Referring to FIG. 3, in some embodiments, the light guide plate 100 includes a stacked structure including a plurality of light guide medium layers 110 and one or more spacer layers 117. Optionally, a respective one of the one or more spacer layers 117 spaces apart adjacent light guide medium layers of the plurality of light guide medium layers 110. Optionally, a refractive index of a respective one of the plurality of light guide medium layers 110 is greater than a refractive index of air, and greater than a refractive index of the respective one of the one or more spacer layers 117. Optionally, refractive indexes of the plurality of light guide medium layers 110 are different from each other, so the light of a respective wavelength range can be totally reflected by one of the plurality of light guide medium layers 110, which may further reduce the possibility of crosstalk between the light of different wavelength ranges, and increase the detection accuracy of the light extraction apparatus.

In one example, a respective one of the plurality of light guide medium layers 110 transmits only light of one wavelength range. In another example, the respective one of the plurality of light guide medium layers 110 transmits light of more than one wavelength ranges.

In some embodiments, light of different wavelength ranges include the light of first wavelength range emitted from the first light source 210 of the plurality of light sources 200 of different colors.

In some embodiments, the light guide plate 100 includes the stacked structure including a first light guide medium layer 111, one of the one or more spacer layers 117, and a second light guide medium layer 111'.

Optionally, the first light guide medium layer 111 is configured to totally reflect the light of the first wavelength range incident from the first light source 210 of the first wavelength range. The second light guide medium layer 111' is configured to totally reflect the light incident from remaining light sources of wavelength ranges different from the first wavelength range.

In some embodiments, the plurality of light extractors 120 includes the first light extractor 121 on a side of the first light guide medium layer 111 away from the plurality of light incident portions 112. Optionally, the first light extractor 121 is optically coupled with the first light guide medium layer 111. Optionally, the first light extractor 121 is configured to extract light incident from the first light source 210 of the first wavelength range and totally reflected in the first light guide medium layer 111, to emit out of the first light guide medium layer 111.

In some embodiments, remaining light extractors of the plurality of light extractors 120 other than the first light extractor 121 are on a side of the second light guide medium layer 111' away from the plurality of light incident portions 112. Optionally, the remaining light extractors are optically coupled with the second light guide medium layer 111'. Optionally, the remaining light extractors are configured to respectively extract light incident from remaining light sources of wavelength ranges different from the first wavelength range and totally reflected in the second light guide medium layer 111', to emit out of the second light guide medium layer 111'.

In some embodiments, the first light guide medium layer 111 totally reflects the light of only the first wavelength range incident from the first light source 210, which may separate the light of the first light source 210 from the light of remaining light source of wavelength ranges different from the first wavelength range, may reduce the crosstalk between the light of different wavelength ranges, and may increase the detection accuracy of the light extraction apparatus.

In some embodiments, a refractive index of a medium for light with a smaller wavelength is greater than a refractive index of the same medium for light with a larger wavelength. For example, a refractive index of a medium for purple light is greater than a refractive index of the same medium for red light. According to the principle of total reflection, a value of a sine of the critical angle for total reflection equals to a value of a reciprocal of the refractive index. Light with a smaller wavelength has a small critical angle for total reflection. And it is easier for light with a smaller wavelength to be totally reflected. Optionally, the light of the first wavelength range is a light with a larger-wavelength range. A critical angle for total reflection of the light of the first wavelength range is greater.

For example, the incident angle of the light of the first wavelength rang emitted from the first light source 210 of the first wavelength range can be larger to allow the first light guide medium layer 111 to totally reflect the light of the first wavelength range. Incident angles of light incident from remaining light sources of wavelength ranges different from the first wavelength range can be smaller, so that the first light guide medium layer 111 cannot totally reflect the light of wavelength ranges different from the first wavelength range.

In some embodiments, the light of different wavelength ranges includes light of second wavelength range emitted from the second light source 220, and a third wavelength range emitted from the third light source 230. The plurality of light extractors 120 includes a second light extractor 122, and a third light extractor 123. Optionally, the second light extractor 122 and the third light extractor 123 are on a side of the second light guide medium layer 111' away from the plurality of light incident portions 112. In one example, the second light extractor 122 is optically couple with the second light guide medium layer 111' to extract light of the second wavelength range totally reflected in the second light guide medium layer 111'. In another example, the third light extractor 113 is optically couple with the second light guide medium layer 111' to extract light of the third wavelength range totally reflected in the second light guide medium layer 111'.

Referring to FIG. 3, in order to clearly illustrate the light paths in the light extraction apparatus, the cross-sectional view of the light extraction apparatus 1000 shows the light paths of light emitted from the first light source 210, the second light source 220, and the third light source 230 at the same time. However, in practice, the light paths of light emitted from the first light source 210, the second light source 220, and the third light source 230 do not have to necessarily exist in a same cross-sectional plane of the light extraction apparatus. Optionally, the light paths of light emitted from the first light source 210, the second light source 220, and the third light source 230 exist in different cross-sectional planes of the light extraction apparatus 1000.

In some embodiments, wavelength ranges of light emitted respectively from the plurality of light sources 200 of different colors do not overlap with each other.

In one example, light emitted from the plurality of light sources 200 of different colors is not perfectly collimated light, so the incident angle of light cannot be strictly controlled in a certain angle. Referring to both FIG. 2 and FIG. 3, the plurality of light incident portions 112 are spaced apart along the second direction. Optionally, the inter-portion distance between adjacent light incident portions of the plurality of light incident portions 112 is greater than ⅙ of a maximum distance between the respective one of the plurality of light extractors 120 and the respective one of the plurality of light sources 200 of different colors optically coupled together. Optionally, the inter-portion distance between adjacent light incident portions of the plurality of light incident portions 112 is greater than ⅙ of a maximum distance between the respective one of the plurality of light extractors 120 and the respective one of the plurality of light incident portions 112 optically coupled together. During a light transmission process, light of different wavelength ranges respective emitted from the plurality of light source 200 of different colors will not overlaps with each other within a certain distance, which ensures that light extracted by a respective one of the plurality of light extractors is light of a respective wavelength range.

In another example, light emitted from the plurality of light sources 200 of different colors is perfectly collimated light. The plurality of light incident portions 112 are not spaced apart along the second direction.

In some embodiments, referring to both FIG. 2 and FIG. 3, the plurality of light incident portions 112 includes a first light incident portion 1121, a second light incident portion 1122, and a third light incident portion 1123. For example, the first light incident portion 1121, the second light incident portion 1122, and the third light incident portion 1123 are not spaced apart from each other along the second direction.

Optionally, the first light incident portion 1121 is optically coupled with the first light extractor 121. The first light incident portion 1121 is spaced apart from the first light extractor 121 along a first direction. The first light incident portion 1121 is configured to introduce light of the first wavelength range emitted from the first light source 210 into the first light guide medium layer 111 to be totally reflected therein.

Optionally, the second light incident portion 1122 is optically coupled with the second light extractor 122. The second light incident portion 1122 is spaced apart from the second light extractor 122 along the first direction. The second light incident portion 1122 is configured to introduce light of the second wavelength range emitted from the second light source 220 into the second light guide medium layer 111' to be totally reflected therein.

Optionally, the third light incident portion 1123 is optically coupled with the third light extractor 123, the third light incident portion 1123 is spaced apart from the third light extractor 123 along the first direction. The third light incident portion 1123 is configured to introduce light of the third wavelength range emitted from the third light source 230 into the second light guide medium layer 111' to be totally reflected therein.

Figure 4:
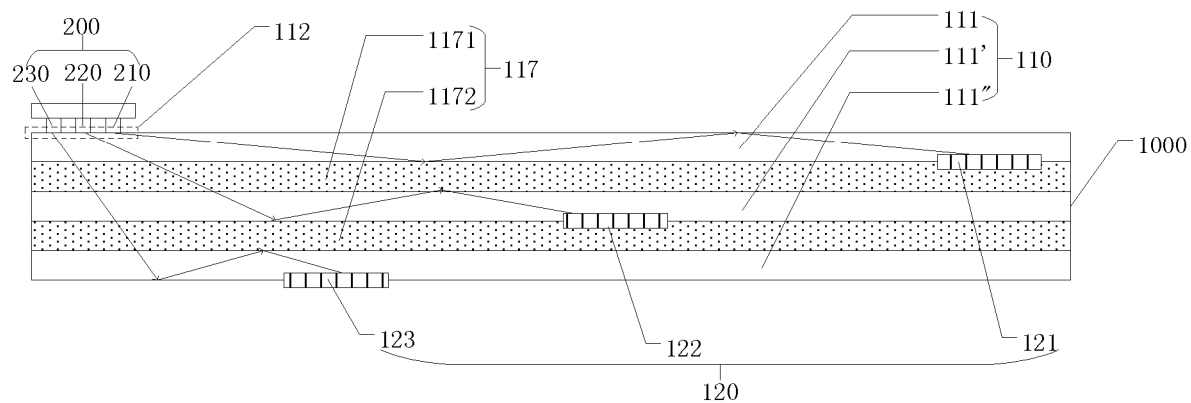
FIG. 4 is a cross-sectional view of a light extraction apparatus in some embodiments according to the present disclosure.

FIG. 4 is a cross-sectional view of a light extraction apparatus in some embodiments according to the present disclosure. Referring to FIG. 4, in some embodiments, the respective one of the plurality of light extractors 120 is optically coupled with a respective one of the light guide medium layers 110, and is configured to extract light incident from a respective one of the plurality of light sources 200 of different colors and totally reflected in the respective one of the light guide medium layers 110, to emit out of the respective one of the light guide medium layers 110. Optionally, the respective one of the plurality of light extractors 120 is on a side of the respective one of the light guide medium layers 110 away from the plurality of light incident portions 112.

In some embodiments, the plurality of light sources 200 of different colors includes a first light source 210 emitting light of a first wavelength range, a second light source 220 emitting light of a second wavelength range, and a third light source 230 emitting light of a third wavelength range. And light of different wavelength ranges includes the light of the first wavelength range, the light of the second wavelength range, and the light of the third wavelength range.

In some embodiments, the light guide plate 100 includes the stacked structure including a first light guide medium layer 111, a first spacer layer 1171 of one or more spacer layers 117, a second light guide medium layer 111', a second spacer layer 1172 of one or more spacer layers 117, and a third light guide medium layer 111".

In one example, the first light guide medium layer 111 is optically coupled with the first light source 210. Optionally, the first light guide medium layer 111 is configured to totally reflect light of the first wavelength range in the first light guide medium layer 111.

In another example, the second light guide medium layer 111' is optically coupled with the second light source 220. Optionally, the second light guide medium layer 111' is configured to totally reflect light of the second wavelength range in the second light guide medium layer 111'.

In another example, the third light guide medium layer 111" is optically coupled with the third light source 230. Optionally, the third light guide medium layer 111" is configured to totally reflect light of the third wavelength range in the third light guide medium layer 111".

In some embodiments, the plurality of light extractors 120 includes a first light extractor 121, a second light extractor 122, and a third light extractor 123.

In one example, the first light extractor 121 is on a side of the first light guide medium layer 111 away from the plurality of light incident portions 112. And the first light extractor 121 is optically coupled with the first light guide medium layer 111 to extract light of the first wavelength range totally reflected in the first light guide medium layer 111.

In another example, the second light extractor 122 is on a side of the second light guide medium layer 111' away from the plurality of light incident portions 112. And the second light extractor 122 is optically coupled with the second light guide medium layer Ill' to extract light of the second wavelength range totally reflected in the second light guide medium layer 111'.

In another example, the third light extractor 123 is on a side of the third light guide medium layer 111" away from the plurality of light incident portions 112. And the third light extractor 123 is optically coupled with the third light guide medium layer 111" to extract light of the third wavelength range totally reflected in the third light guide medium layer 111".

In some embodiments, the first light guide medium layer 111 only totally reflects the light of the first wavelength range incident from the first light source 210. The second light guide medium layer 111' only totally reflects the light of the second wavelength range incident from the second light source 220. And the third light guide medium layer 111" only totally reflects the light of the first wavelength range incident from the third light source 230. So, this arrangement of the plurality of light guide medium layers 110 and the plurality of light sources 200 allows the light of the first wavelength range, the light of the second wavelength range, and the light of the third wavelength range to be totally reflected in three separated light guide medium layers, respectively, which may reduce the crosstalk between the light of different wavelength ranges, and may increase the detection accuracy of the light extraction apparatus.

In some embodiments, a refractive index of a medium for light with a smaller wavelength is greater than a refractive index of the same medium for light with a larger wavelength. For example, a refractive index of a medium for purple light is greater than a refractive index of the same medium for red light. According to the principle of total reflection, a value of a sine of the critical angle for total reflection equals to a value of a reciprocal of the refractive index. Light with a smaller wavelength has a small critical angel for total reflection.

For example, a wavelength of the second wavelength range is greater than a wavelength of the third wavelength range, a critical angle of total reflection of the light of a second wavelength range is greater than a critical angle of total reflection of the light of the third wavelength range. An incident angle of the light of second wavelength range can be larger to allow the second light guide medium layer 111' to totally reflect the light of the second wavelength range. An incident angle of the light of third wavelength range can be smaller so that the second light guide medium layer 111' cannot totally reflect the light of third wavelength range.

Referring to FIG. 4, in order to clearly illustrate the light paths in the light extraction apparatus, the cross-sectional view of the light extraction apparatus 1000 shows the light paths of light emitted from the first light source 210, the second light source 220, and the third light source 230 at the same time. However, in practice, the light paths of light emitted from the first light source 210, the second light source 220, and the third light source 230 do not have to necessarily exist in a same cross-sectional plane of the light extraction apparatus. Optionally, the light paths of light emitted from the first light source 210, the second light source 220, and the third light source 230 exist in different cross-sectional planes of the light extraction apparatus 1000 parallel to the cross-sectional plane shown in FIG. 4.

In some embodiments, wavelength ranges of light emitted respectively from the plurality of light sources 200 of different colors do not overlap with each other.

In one example, light emitted from the plurality of light sources 200 of different colors is not perfectly collimated light, so the incident angle of light cannot be strictly controlled in a certain angle. Referring to both FIG. 2 and FIG. 4, the plurality of light incident portions 112 are spaced apart along the second direction. Optionally, the inter-portion distance between adjacent light incident portions of the plurality of light incident portions 112 is greater than ⅙ of a maximum distance between the respective one of the plurality of light extractors 120 and the respective one of the plurality of light sources 200 of different colors optically coupled together. Optionally, the inter-portion distance between adjacent light incident portions of the plurality of light incident portions 112 is greater than ⅙ of a maximum distance between the respective one of the plurality of light extractors 120 and the respective one of the plurality of light incident portions 112 optically coupled together. During a light transmission process, light of different wavelength ranges respective emitted from the plurality of light source 200 of different colors will overlaps with each other after the light of different wavelength ranges transmits for a certain distance, which ensures that light extracted by a respective one of the plurality of light extractors is light of a respective wavelength range.

In another example, light emitted from the plurality of light sources 200 of different colors is perfectly collimated light. The plurality of light incident portions 112 are not spaced apart along the second direction.

In some embodiments, referring to both FIG. 2 and FIG. 4, the plurality of light incident portions includes the first light incident portion 1121, the second light incident portion 1122, and the third light incident portion 1123. For example, the first light incident portion 1121, the second light incident portion 1122, and the third light incident portion 1123 are not spaced apart from each other along the second direction.

Optionally, the first light incident portion 1121 is optically coupled with the first light extractor 121. The first light incident portion 1121 is spaced apart from the first light extractor 121 along a first direction. The first light incident portion 1121 is configured to introduce light of the first wavelength range emitted from the first light source 210 into the first light guide medium layer 111 to be totally reflected therein.

Optionally, the second light incident portion 1122 is optically coupled with the second light extractor 122. The second light incident portion 1122 is spaced apart from the second light extractor 122 along the first direction. The second light incident portion 1122 is configured to introduce light of the second wavelength range emitted from the second light source 220 into the second light guide medium layer 111' to be totally reflected therein.

Optionally, the third light incident portion 1123 is optically coupled with the third light extractor 123. The third light incident portion 1123 is spaced apart from the third light extractor 123 along the first direction. The third light incident portion 1123 is configured to introduce light of the third wavelength range emitted from the third light source 230 into the third light guide medium layer 111" to be totally reflected therein.

Referring to both FIG. 2 and FIG. 4, in some embodiments, the first light extractor 121, the second light extractor 122, and the third light extractor 123 are sequentially disposed along the first direction.

In some embodiments, a distance between the first light extractor 121 and the first light source 210 of the first wavelength range optically coupled with the first light extractor 121 is greater than a distance between the second light extractor 122 and the second light source 220 of the second wavelength range optically coupled with the second light extractor 122. Optionally, a distance between the first light extractor 121 and the first light incident portion 1121 optically coupled with the first light extractor 121 is greater than a distance between the second light extractor 122 and the second light incident portion 1122 optically coupled with the second light extractor 122.

In some embodiments, the distance between the second light extractor 122 and the second light source 220 of the second wavelength range optically coupled with the second light extractor 122 is greater than a distance between the third light extractor 123 and the third light source 230 of the third wavelength range optically coupled with the third light extractor 123. Optionally, the distance between the second light extractor 122 and the second light incident portion 1122 optically coupled with the second light extractor 122 is greater than a distance between the third light extractor 123 and the third light incident portion 1123 optically coupled with the third light extractor 123.

Various materials may be used for making the plurality of light guide medium layer 110 of the light guide plate 100. Examples of materials suitable for making the plurality of light guide medium layer 110 include, but are not limited to, indium tin oxide (ITO), silicon oxide, silicon nitride, glass, or resin. Materials for making the plurality of light guide medium layer 110 is based on the different requirements of refractive index of the plurality of light guide medium layer 110.

In some embodiments, a respective one of the light sources of different color, a respective one of the plurality of the light incident portions, a respective one of the plurality of light guide medium layers, a respective one of the plurality of light extractors are optically coupled together along the light path of a light emitting out of the respective one of the light sources of different colors.

Figure 5A:
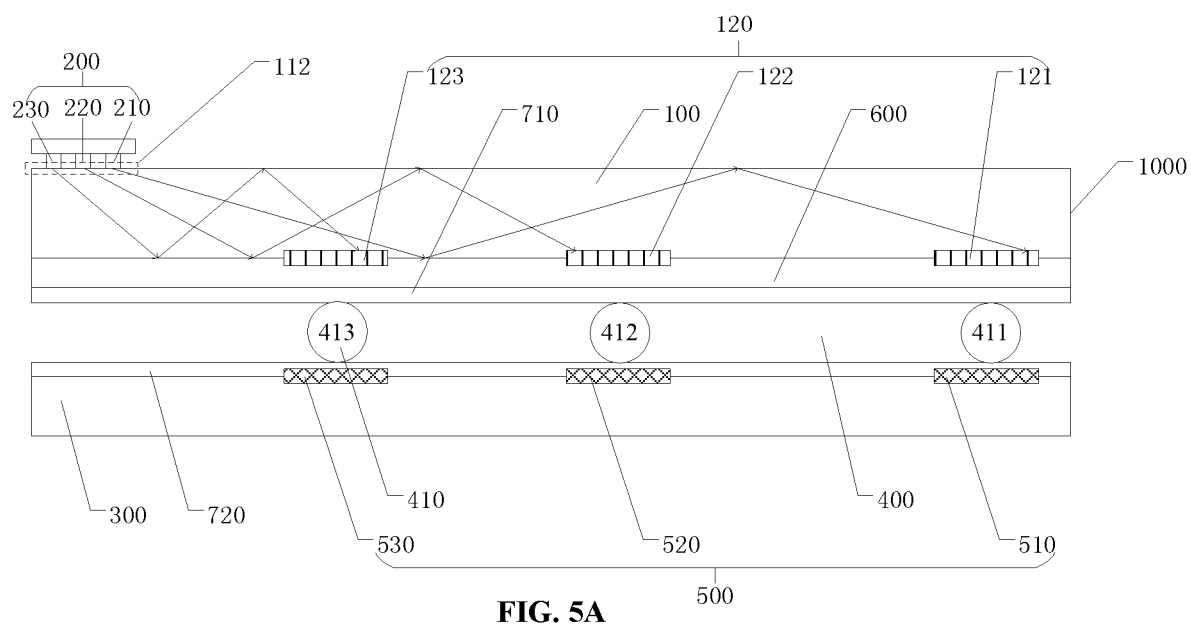
FIGS. 5A-5C are a cross sectional view of a microfluidic apparatus in some embodiments according to the present disclosure.
Figure 5B:
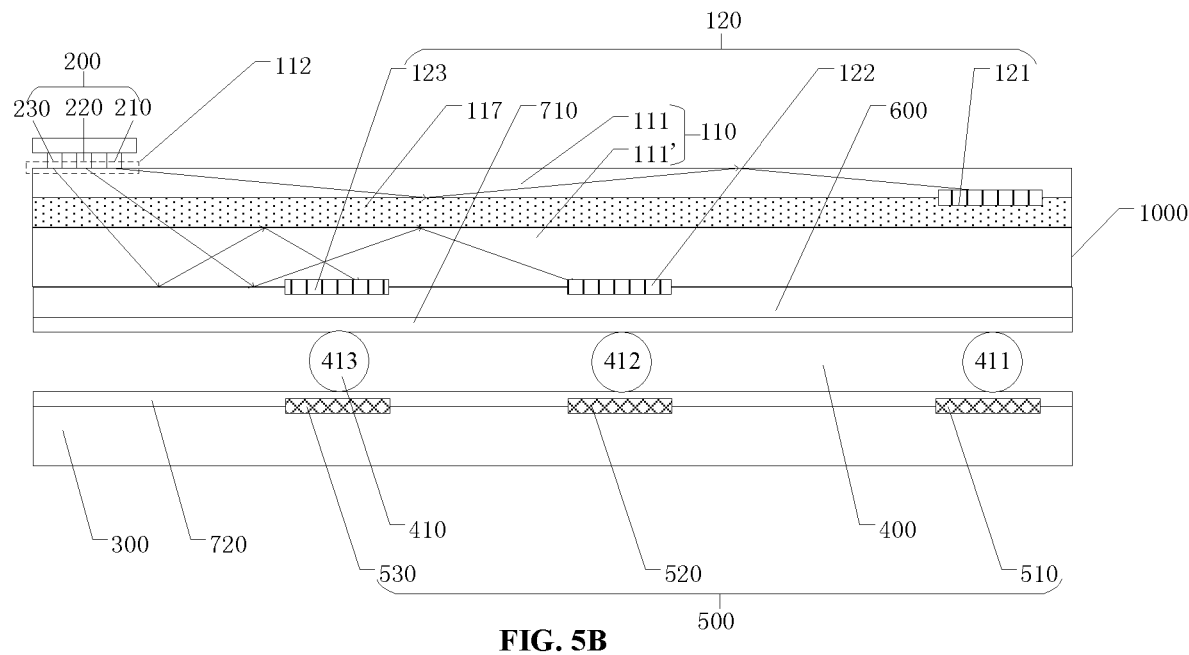
Figure 5C:
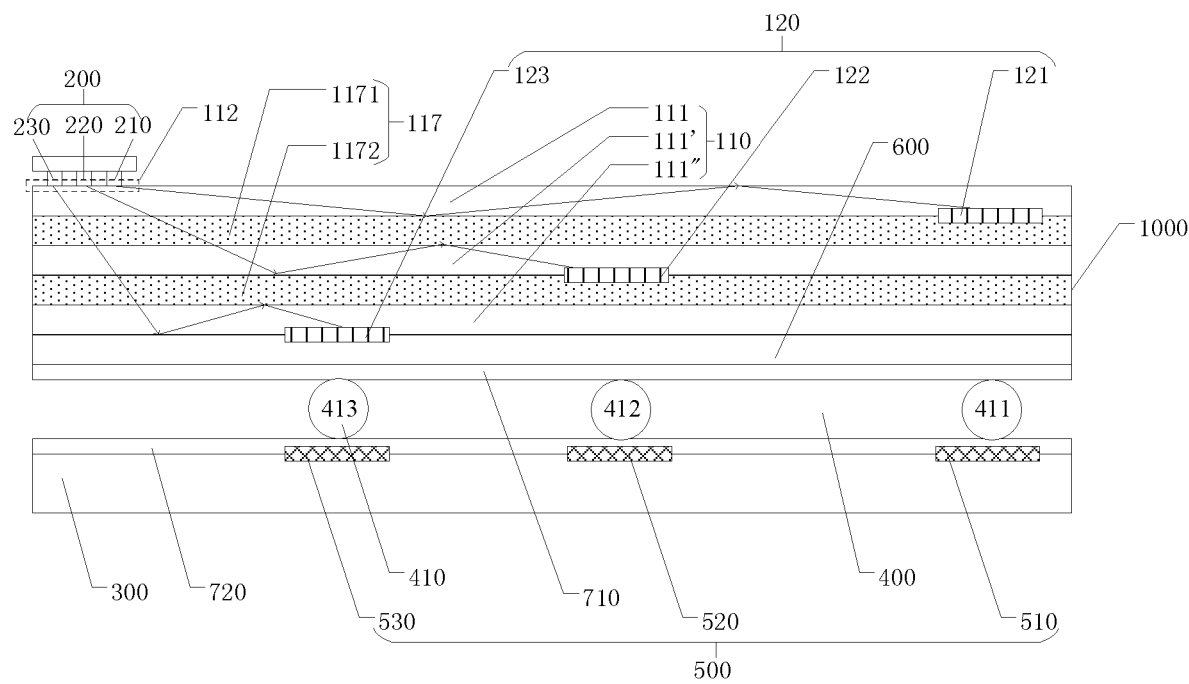

In another aspect, the present disclosure provides a microfluidic apparatus. FIGS. 5A-5C are a cross sectional view of a microfluidic apparatus in some embodiments according to the present disclosure. Referring to FIG. 5A, in some embodiments, the microfluidic apparatus includes the light extraction apparatus 1000 mentioned herein. Because the light extraction apparatus 1000 can provide light of different wavelength ranges extracted by the plurality of light extractors 120. A respective one of the plurality of light extractors 120 can extract light of a respective wavelength range to detect a substances in a respective one of the plurality of micro fluidic channels. Therefore, the microfluidic apparatus having the light extraction apparatus 1000 herein can detect multiple substances at the same time. And the microfluidic apparatus having the light extraction apparatus 1000 can effectively, rapidly, and accurately detect multiple substances. In some embodiments, the plurality of light extractors 120 of the light extraction apparatus 1000 is on a same light guide plate 100, which is good for the miniaturization and integration of the microfluidic apparatus.

Various structures may be used for making the light extraction apparatus. Optionally, the light extraction apparatus 1000 has the light guide plate 100 including a single light guide medium layer as shown in FIG. 5A. Optionally, the light extraction apparatus 1000 has the light guide plate 100 a stacked structure having two light guide medium layers as shown in FIG. 5B. Optionally, the light extraction apparatus 1000 has the light guide plate 100 a stacked structure having three light guide medium layers as shown in FIG. 5C.

In some embodiments, the microfluidic apparatus can be used in the fields of molecular diagnosis, food quarantine, bacterial division, etc.

In some embodiments, the microfluidic apparatus includes a base substrate 300; a microfluidic device 400 on the base substrate 300; a plurality of light sources 200 of different colors respectively emitting light of different wavelength ranges; a light extraction apparatus 1000 for extracting light respectively from the plurality of light sources 200 of different colors; and a plurality of photosensors 500.

In some embodiments, the microfluidic device 400 includes a plurality of microfluidic channels 410. Optionally, the microfluidic device 400 includes at least one of the plurality of microfluidic channels 410.

Optionally, the light extraction apparatus 1000 includes a light guide plate 100 having a plurality of light incident portions 112 for respectively receiving light respectively incident from the plurality of light sources 200 of different colors. Optionally, the plurality of light incident portions 112 are on a side of the light guide plate 100 away from the microfluidic device 400. Optionally, a plurality of light extractors 120 is on the light guide plate 100.

Optionally, a respective one of the plurality of light extractors 120 is optically coupled with a respective one of the plurality of light sources of different colors. Optionally, the respective one of the plurality of light extractors 120 is configured to extract light incident from a respective one of the plurality of light incident portions 112 of the light guide plate 100 and totally reflected in the light guide plate 100, to emit out of the light guide plate 100. Optionally, light emitting out of the plurality of light extractors is of different wavelength ranges. Optionally, orthographic projections of the plurality of light extractors 120 on the light guide plate 100 are spaced apart from each other.

Referring to FIG. 5A, the microfluidic apparatus includes a plurality of light sources 200 of different colors respectively emitting light of different wavelength ranges. Optionally, the plurality of light sources 200 of different colors are on a side of the light guide plate 100 having the plurality of light incident portions 112. The plurality of light sources 200 of different colors are configured to respective emit light of different wavelength ranges incident into the light guide plate 100 through the plurality of light incident portions 112.

Referring to both FIG. 2 and FIG. 5A, the plurality of light sources 200 of different colors includes a first light source 210, a second light source 220, and a third light source 230. Optionally, the first light source 210 emits light of a first wavelength range. The second light source 220 emits light of a second wavelength range. The third light source 230 emits light of a third wavelength range.

For example, the light of the first wavelength range from the first light source 210 is incident into the light guide plate 100 through a first light incident portion 1121 of the plurality of light incident portions 112. The light of the second wavelength range from the second light source 220 is incident into the light guide plate 100 through the second light incident portion 1122 of the plurality of light incident portions 112. The light of the third wavelength range from the third light source 230 is incident into the light guide plate 100 through the third light incident portion 1123 of the plurality of light incident portions 112.

Referring to FIG. 1B, in some embodiments, the light guide plate 100 includes a light guide medium layer 101. The light guide medium layer 101 has a first surface S1 and a second surface S2 facing the first surface S1. After a light is incident into the light guide plate 100, the light is totally reflected by the first surface S1, as well as totally reflected by the second surface S2. Optionally, the first surface S1 and the second surface S2 are parallel to each other.

Assuming a refractive index of the light guide medium layer 101 is n1, a refractive index of a first medium 102 on a first surface S1 of the light guide medium layer 101 away from the second surface S2 is n0. A refractive index of a second medium 103 on a second surface S2 of the light guide medium layer 101 away from the first surface S1 is n2. Optionally, n2>n0. A first total reflective angle θ0 of the first surface S1 and a second total reflective angle θ1 of the second surface S2 are as follows:

$$\theta 0 = \arcsin(n0/n1)$$

$$\theta 1 = \arcsin(n2/n1)$$

When a light has an incident angle θ on the first surface or on the second surface satisfying a requirement that θ0<θ1<θ<90, the light will be totally reflected by the first surface and the second surface of the light guide plate 100.

Various elements may be used for making the plurality of light sources 200 of different colors. Examples of elements suitable for making the plurality of light sources 200 of different colors includes, but are not limited to, laser chips and light emitting diode chips. Optionally, laser chips include semiconductor laser chips. Optionally, light emitting diode chips include multi-color light-emitting diode (LED) chips emitting better collimated light. Optionally, beam expanders are disposed on a light emitting side of the laser chips or the light emitting diode chips.

In some embodiments, the microfluidic device 400 is between the base substrate 300, and the light extraction apparatus 1000. Optionally, the microfluidic device 400 includes a plurality of microfluidic channels 410. Optionally, an orthographic projection of a respective one of the plurality of microfluidic channels 410 on the base substrate 300 at least partially overlaps with an orthographic projection of a respective one of the plurality of light extractors 120 on the base substrate 300. For example, a substance in a respective one of the plurality of microfluidic channels 410 can be detected by light of a respective wavelength range extracted by a respective one of the plurality of light extractors 120.

In some embodiments, the plurality of microfluidic channels 410 are channels transmitting microfluid. Optionally, widths and heights of the plurality of microfluidic channels 410 are in nanoscale. Optionally, widths and heights of the plurality of microfluidic channels 410 are greater than nanoscale. Optionally, widths and heights of the plurality of microfluidic channels 410 are less than nanoscale.

In some embodiments, the plurality of microfluidic channels 410 include a first microfluidic channel 411, a second microfluidic channel 412, and a third microfluidic channel 413. Optionally, the plurality of light incident portions 112 is on a side of the light extraction apparatus 1000 away from the microfluidic device 400.

Referring to FIG. 5A, the orthographic projection of a respective one of the plurality of microfluidic channels 410 on the base substrate 300 at least partially overlaps with the orthographic projection of a respective one of the plurality of light extractors 120 on the base substrate 300. Optionally, an orthographic projection of a respective one of the plurality of photosensors 500 on the base substrate 300 at least partially overlaps with the orthographic projection of the respective one of the plurality of light extractors 120 on the base substrate 300. Optionally, the respective one of the plurality of photosensors 500 is configured to detect light extracted from the respective one of the plurality of light extractors 120.

For example, prior to a substance of a respective one of the plurality of microfluidic channels 410 is detected using light of a respective wavelength range extracted by a respective one of the plurality of light extractor 120, a respective one of the plurality of photosensors 500 can detect light extracted from the respective one of the plurality of light extractors 120 without being transmitted through the substance. Subsequent to the substance of the respective one of the plurality of microfluidic channels 410 is detected using the light of the respective wavelength range extracted by the respective one of the plurality of light extractor 120. The respective one of the plurality of photosensors 500 can detect light extracted from the respective one of the plurality of light extractors 120 and transmitted through the substance. The changes (e.g. change of light intensity) of the light extracted from the respective one of the plurality of light extractors 120 can be obtained to perform the quick detection.

Various appropriate methods may be used for forming the plurality of microfluidic channels 410. Examples of methods suitable for forming the plurality of microfluidic channels 410 include, but are not limited to, lithography, and etching.

Various appropriate materials may be used for forming the plurality of microfluidic channels 410. Examples of materials suitable for forming the plurality of microfluidic channels 410 include, but are not limited to, silicon, glass, and polymer (e.g. Polydimethylsiloxane (PDMS), and Poly(methyl methacrylate) (PMMA)). For example, the plurality of microfluidic channels 410 is formed by etching silicon, glass, and polymer including PDMS and PMMA. For example, the plurality of microfluidic channels 410 is formed by applying lithography on silicon, glass, and polymer including PDMS and PMMA.

Various appropriate materials may be used for making the base substrate 300. Examples of materials suitable for making the base substrate 300 includes glass, resin, polyester compounds, and paper-based materials. Optionally, the base substrate 300 is made of glass. The glass substrate can absorb a small amount of light, which can reduce the interruption of the detection due to the glass substrate.

Referring to FIG. 5A, in some embodiments, the plurality of photosensors 500 includes a first photosensor 510, a second photosensor 520, and a third photosensor 530. Optionally, the plurality of photosensors 500 are photosensitive detector.

Various appropriate components may be used for forming the plurality of photosensors 500. Examples of components suitable for forming the plurality of photosensors 500 include, but are not limited to, Charge-coupled Device (CCD), Complementary Metal Oxide Semiconductor (CMOS), and PIN.

In some embodiments, the plurality of light extractors 120 includes a first light extractor 121, a second light extractor 122, and the third light extractor 123. Optionally, the plurality of light extractors 120 are on a surface of the light guide plate 100 opposite to a surface of the light guide plate 100 having the plurality of light incident portions 112.

Optionally, the respective one of the plurality of light extractors 120 is selected from a group consisting of a grating structure, diffuser dots, a wave filter, and a micromirror.

For example, the first light extractor 121 is optically coupled with the first photosensor 510. The second light extractor 122 is optically coupled with the second photosensor 520. The third light extractor 123 is optionally coupled with the third photosensor 530.

In some embodiments, the orthographic projections of the plurality of light extractors 120 on the light guide plate 100 are spaced apart from each other along a first direction and along a second direction. Optionally, the second direction is different from the first direction. In some embodiments, the plurality of light incident portions 112 are spaced apart along the second direction.

In some embodiments, the respective one of the plurality of light extractors 120 is optically coupled to the respective one of the plurality of light sources 200 of different colors is aligned with the respective one of the plurality of light sources 200 of different colors along the first direction. Optionally, the respective one of the plurality of light extractors 120 is optically coupled to the respective one of the plurality of light sources 200 of different colors is aligned with the respective one of the plurality of light incident portions 112 along the first direction.

In some embodiments, an inter-portion distance between adjacent light incident portions of the plurality of light incident portions 112 is greater than ⅙ of a maximum distance between the respective one of the plurality of light extractors 120 and the respective one of the plurality of light sources 200 of different colors optically coupled together. Optionally, the inter-portion distance between adjacent light incident portions of the plurality of light incident portions 112 is greater than ⅙ of a maximum distance between the respective one of the plurality of light extractors 120 and the respective one of the plurality of light incident portions 112 optically coupled together.

In some embodiments, wavelength ranges of light emitted respectively from the plurality of light sources of different colors do not overlap with each other.

Referring to both FIG. 5B and FIG. 5C, in some embodiments, the light guide plate 100 includes a stacked structure including a plurality of light guide medium layers 110 and one or more spacer layers 117. Optionally, a respective one of the one or more spacer layers 117 spaces apart adjacent light guide medium layers of the plurality of light guide medium layers 110. Optionally, a refractive index of a respective one of the plurality of light guide medium layers 110 is greater than a refractive index of air and greater than a refractive index of the respective one of the one or more spacer layers 117. Optionally, refractive indexes of the plurality of light guide medium layers 110 are different from each other.

Referring to FIG. 5B, in some embodiments, the plurality of light guide medium layers 110 includes a first light guide medium layer Ill and a second light guide medium layer 111'. Optionally, the plurality of light extractors 120 includes the first light extractor 121 on a side of the first light guide medium layer 111 away from the plurality of light incident portions 112. In one example, the first light extractor 121 is optically coupled with the first light guide medium layer 111. In another example, the first light extractor 121 is configured to extract light incident from the first light source 210 of the first wavelength range and totally reflected in the first light guide medium layer, to emit out of the first light guide medium layer 111. Optionally, remaining light extractors of the plurality of light extractors 120 other than the first light extractor 121 are on a side of the second light guide medium layer 111' away from the plurality of light incident portions 112. In one example, the remaining light extractors are optically coupled with the second light guide medium layer 111". In another example, the remaining light extractors are configured to respectively extract light incident from remaining light sources of wavelength ranges different from the first wavelength range and totally reflected in the second light guide medium layer 111', to emit out of the second light guide medium layer 111'.

Referring to FIG. 5C, in some embodiments, the respective one of the plurality of light extractors 120 is optically coupled with a respective one of the light guide medium layers 110. Optionally, the respective one of the plurality of light extractors 120 is configured to extract light incident from a respective one of the plurality of light sources 200 of different colors and totally reflected in the respective one of the light guide medium layers 110, to emit out of the respective one of the light guide medium layers 110. Optionally, the respective one of the plurality of light extractors 120 is on a side of the respective one of the light guide medium layers 110 away from the plurality of light incident portions 112.

In some embodiments, the plurality of light sources 200 of different colors includes a first light source 210 emitting light of a first wavelength range, a second light source 220 emitting light of a second wavelength range, and a third light source 230 emitting light of a third wavelength range.

Optionally, the plurality of light guide medium layers 110 includes a first light guide medium layer 111 optically coupled with the first light source 210 and configured to totally reflect light of the first wavelength range in the first light guide medium layer 111, a second light guide medium layer 111' optically coupled with the second light source 220 and configured to totally reflect light of the second wavelength range in the second light guide medium layer 111', and a third light guide medium layer 111" optically coupled with the third light source 230 and configured to totally reflect light of the third wavelength range in the third light guide medium layer 111".

Optionally, the plurality of light extractors 120 includes a first light extractor 121 on a side of the first light guide medium layer 111 away from the plurality of light incident portions 112 and optically coupled with the first light guide medium layer 111 to extract light of the first wavelength range totally reflected in the first light guide medium layer 111, a second light extractor 122 on a side of the second light guide medium layer 111' away from the plurality of light incident portions 112 and optically coupled with the second light guide medium layer 111' to extract light of the second wavelength range totally reflected in the second light guide medium layer 111', and a third light extractor 123 on a side of the third light guide medium layer 111" away from the plurality of light incident portions 112 and optically coupled with the third light guide medium layer 111" to extract light of the third wavelength range totally reflected in the third light guide medium layer 111".

Figure 6:
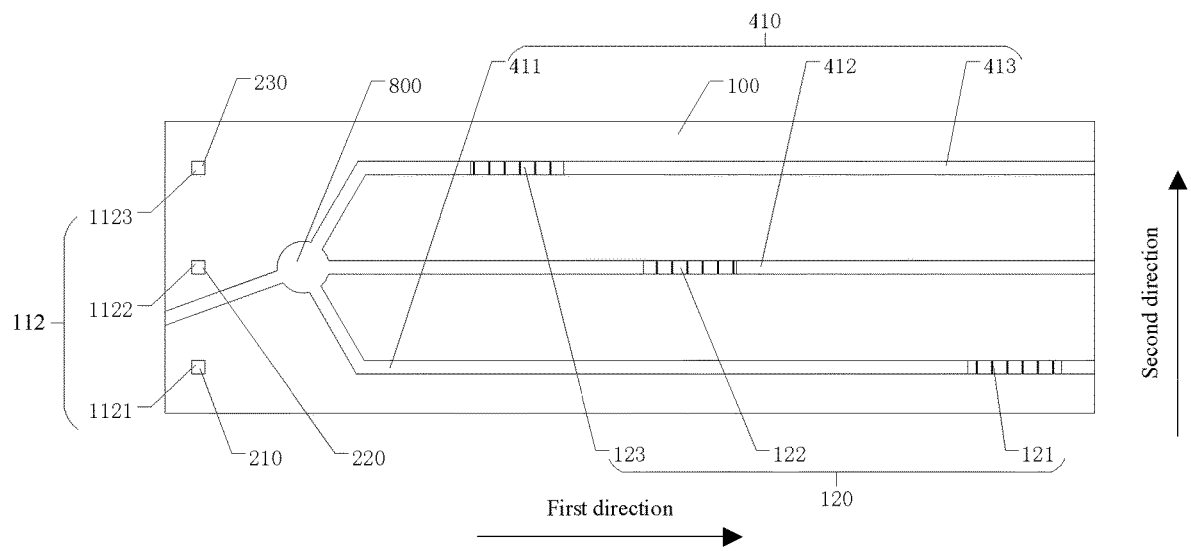
FIG. 6 is a plan view of a microfluidic apparatus in some embodiments according to the present disclosure.

FIG. 6 is a plan view of a microfluidic apparatus in some embodiments according to the present disclosure. Referring to FIG. 6, the plurality of light incident portions 112 includes a first light incident portion 1121, a second light incident portion 1122, and a third light incident portion 1123.

Optionally, referring to both FIG. 6 and FIG. 5C, the first light incident portion 1121 is optically coupled with the first light extractor 121. The first light incident portion 1121 is spaced apart from the first light extractor 121 along a first direction. The first light incident portion 1121 is configured to introduce light of the first wavelength range emitted from the first light source 210 into the first light guide medium layer 111 to be totally reflected therein.

Optionally, the second light incident portion 1122 is optically coupled with the second light extractor 122. The second light incident portion 1122 is spaced apart from the second light extractor 122 along the first direction. The second light incident portion 1122 is configured to introduce light of the second wavelength range emitted from the second light source 220 into the second light guide medium layer 111' to be totally reflected therein.

Optionally, the third light incident portion 1123 is optically coupled with the third light extractor 123. The third light incident portion 1123 is spaced apart from the third light extractor 123 along the first direction. The third light incident portion 1123 is configured to introduce light of the third wavelength range emitted from the third light source into the third light guide medium layer 111" to be totally reflected therein.

In some embodiments, a respective one of the light sources of different color, a respective one of the plurality of the light incident portions, a respective one of the plurality of light guide medium layers, a respective one of the plurality of light extractors, a respective one of the plurality of microfluidic channels, and a respective one of the plurality of photosensors are optically coupled together along the light path starting from the respective one of the light sources of different colors emitting the light to the respective one of the plurality of photosensors.

Referring to FIG. 5A, the microfluidic device further includes a protective layer 600 on a side of the microfluidic device 400 closer to the light guide plate 100. Optionally, the protective layer 600 is on a side of the plurality of microfluidic channels 410 closer to the light guide plate 100. For example, the protective layer 600 can protect the plurality of light extractor 120, and prevent the microfluid leakage of the plurality of microfluidic channels 410 from eroding the plurality of light extractors 120.

In some embodiments, the microfluidic device further includes a first hydrophobic layer 710, and a second hydrophobic layer 720. Optionally, the first hydrophobic layer 710 and the second hydrophobic layer 720 sandwich the plurality of microfluidic channels 410. Optionally, the first hydrophobic layer 710 is on a side of the protective layer 600 away from the light guide plate 100. Optionally, the second hydrophobic layer 720 is on a side of the base substrate 300 away from the plurality of photosensors 500. The arrangement of the first hydrophobic layer 710 and the second hydrophobic layer 720 can prevent the microfluid in the plurality of microfluidic channels 410 from adhering in the plurality of microfluidic channels 410.

In some embodiments, the refractive index of the light guide plate 100 is greater than a refractive index of the first hydrophobic layer 710, and greater than a refractive index of the second hydrophobic layer 720. Optionally, the refractive indexes of the light guide medium layers of the light guide plate 100 are greater than a refractive index of the first hydrophobic layer 710, and greater than a refractive index of the second hydrophobic layer 720.

Various appropriate materials may be used for making the first hydrophobic layer 710, and the second hydrophobic layer 720. Optionally, the first hydrophobic layer 710, and the second hydrophobic layer 720 are made of amorphous fluoropolymer (e.g., Teflon®AF).

Referring to FIG. 6, in some embodiments, the first microfluidic channel 411, second microfluidic channel 412, and the third microfluidic channel 413 of the plurality of microfluidic channels 410 extend along the first direction. Optionally, the first microfluidic channel 411, second microfluidic channel 412, and the third microfluidic channel 413 are parallel to each other.

In some embodiments, the first light extractor 121 is optically coupled with the first microfluidic channel 411. The second light extractor 122 is optically coupled with the second microfluidic channel 412. The third light extractor 123 is optically coupled with the third microfluidic channel 413. Optionally, an orthographic projection of the first microfluidic channel 411 on the base substrate 300 at least partially overlaps with an orthographic projection of the first light extractor 121. For example, light of the first wavelength range extracted from the first light extractor 121 can be used to detect a substance in the first microfluidic channel 411. Optionally, an orthographic projection of the second microfluidic channel 412 on the base substrate 300 at least partially overlaps with an orthographic projection of the second light extractor 122. For example, light of the second wavelength range extracted from the second light extractor 122 can be used to detect a substance in the second microfluidic channel 412. Optionally, an orthographic projection of the third microfluidic channel 413 on the base substrate 300 at least partially overlaps with an orthographic projection of the third light extractor 123. For example, light of the third wavelength range extracted from the third light extractor 123 can be used to detect a substance in the third microfluidic channel 413.

In some embodiments, the first direction is a direction along which the microfluid flows in the respective one of the plurality of microfluidic channels 410.

In some embodiments, referring to both FIG. 5A and FIG. 6, the microfluidic device 400 further includes a plurality of reaction microchambers 800 respectively in fluid communication with the plurality of microfluidic channels 410. Optionally, an orthographic projection of a respective one of the plurality of reaction microchambers 800 on the base substrate 300 is between an orthographic projection of a respective one of the plurality of light incident portions 112 on the base substrate 300 and an orthographic projection of a respective one of the plurality of light extractors 120 on the base substrate 300.

Optionally, the microfluidic device 400 includes at least one of the plurality of reaction microchambers 800 in fluid communication with the plurality of microfluidic channels 410. Optionally, the microfluidic device 400 includes one of the plurality of reaction microchambers 800 in fluid communication with the plurality of microfluidic channels 410. Optionally, the plurality of reaction microchambers 800 can perform physical, chemical, or biological treatments on the microfluid in the plurality of reaction microchambers 800.

Optionally, the detection process does not need any physical, chemical, and biological treatment, the microfluidic device 400 does not have a reaction microchamber.

Various appropriate methods may be used for forming the plurality of reaction microchambers 800. Examples of methods suitable for forming the plurality of reaction microchambers 800 include, but are not limited to, lithography, and etching.

Various appropriate materials may be used for forming the plurality of reaction microchambers 800. Examples of materials suitable for forming the plurality of reaction microchambers 800 include, but are not limited to, silicon, glass, and polymer (e.g. Polydimethylsiloxane (PDMS), and Poly (methyl methacrylate) (PMMA)). For example, the plurality of reaction microchambers 800 is formed by etching silicon, glass, and polymer including PDMS and PMMA. For example, the plurality of reaction microchambers 800 is formed by applying lithography on silicon, glass, and polymer including PDMS and PMMA. Optionally, the inner surfaces of the plurality of reaction microchambers 800 are subjected to hydrophobic treatment. Optionally, the inner surfaces of the plurality of reaction microchambers 800 are coated with anti-corrosion layers.

Figure 7:
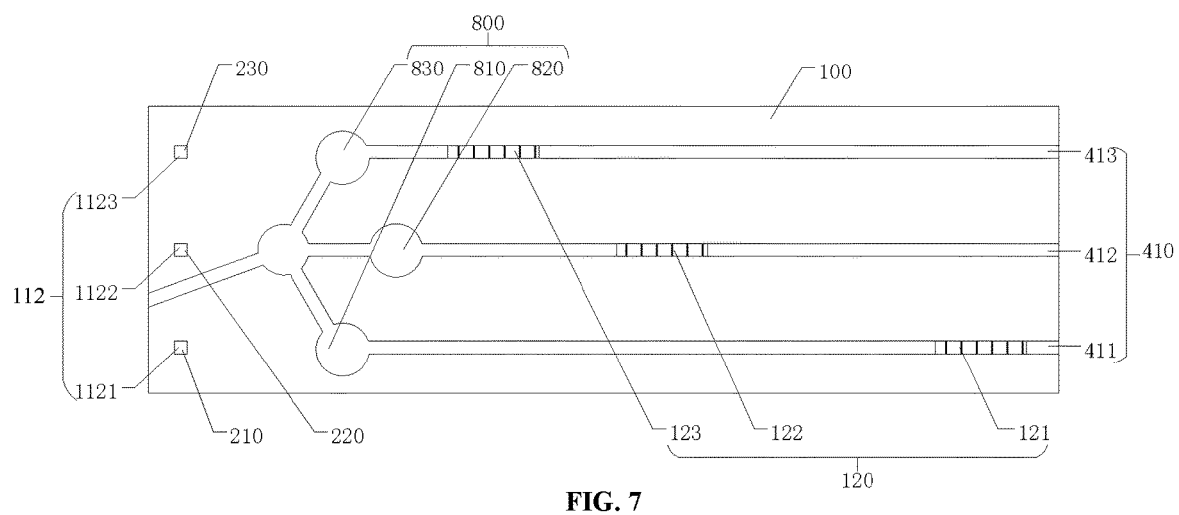
FIG. 7 is a plan view of a microfluidic apparatus in some embodiments according to the present disclosure.

FIG. 7 is a plan view of a microfluidic apparatus in some embodiments according to the present disclosure. Referring to FIG. 7, the plurality of reaction microchambers 800 include a first reaction microchamber 810 in fluid communication with the first microfluidic channel 411, a second reaction microchamber 820 in fluid communication with the second microfluidic channel 412, and a third reaction microchamber 830 in fluid communication with the third microfluidic channel 413.

Optionally, the first reaction microchamber 810 corresponds to the first light extractor 121. Optionally, the second reaction microchamber 820 corresponds to the second light extractor 122. Optionally, the third reaction microchamber 830 corresponds to the third light extractor 123.

Optionally, an orthographic projection of the first reaction microchamber 810 on the base substrate 300 is between an orthographic projection of a respective one of the first light incident portion 1121 on the base substrate 300 and an orthographic projection of the first light extractor 121 on the base substrate 300. An orthographic projection of the second reaction microchamber 820 on the base substrate 300 is between an orthographic projection of a respective one of the second light incident portion 1122 on the base substrate 300 and an orthographic projection of the second light extractor 122 on the base substrate 300. An orthographic projection of the third reaction microchamber 830 on the base substrate 300 is between an orthographic projection of a respective one of the third light incident portion 1123 on the base substrate 300 and an orthographic projection of the third light extractor 123 on the base substrate 300.

Optionally, the first reaction microchamber 810 performs physical, chemical, or biological reaction with a substance in the first microfluidic channel 411. Optionally, the second reaction microchamber 820 performs physical, chemical, or biological reaction with a substance in the second microfluidic channel 412. Optionally, the third reaction microchamber 830 performs physical, chemical, or biological reaction with a substance in the third microfluidic channel 413.

In another aspect, the present disclosure provides a method of detecting a substance in a microfluidic apparatus. Optionally, the method includes respectively emitting light of different wavelength ranges from a plurality of light sources of different colors into a plurality of light incident portions of a light guide plate; respectively totally reflecting light of different wavelength ranges in the light guide plate; respectively extracting light of different wavelength ranges from the light guide plate respectively using a plurality of light extractors on the light guide plate; respectively irradiating light of different wavelength ranges extracted from the light guide plate onto a plurality of micro fluidic channels, a respective one of the plurality of micro fluidic channels being irradiated by a light of a respective one of the different wavelength ranges; and respectively detecting light respectively transmitting through the plurality of micro fluidic channels by a plurality of photosensors.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A microfluidic apparatus, comprising:
a base substrate;
a microfluidic device on the base substrate and comprising a plurality of micro fluidic channels;
a plurality of light sources of different colors respectively emitting light of different wavelength ranges;
a light extraction apparatus for extracting light respectively from the plurality of light sources of different colors and
a plurality of photosensors;
wherein the light extraction apparatus comprises:
a light guide plate having a plurality of light incident portions for respectively receiving light respectively incident from the plurality of light sources of different colors, the plurality of light incident portions being on a side of the light guide plate away from the microfluidic device; and
a plurality of light extractors on the light guide plate;
wherein a respective one of the plurality of light extractors is optically coupled with a respective one of the plurality of light sources of different colors, and is configured to extract light incident from a respective one of the plurality of light incident portions of the light guide plate and totally reflected in the light guide plate, to emit out of the light guide plate, light emitting out of the plurality of light extractors being of different wavelength ranges;
orthographic projections of the plurality of light extractors on the light guide plate are spaced apart from each other;
an orthographic projection of a respective one of the plurality of micro fluidic channels on the base substrate at least partially overlaps with an orthographic projection of a respective one of the plurality of light extractors on the base substrate;
an orthographic projection of a respective one of the plurality of photosensors on the base substrate at least partially overlaps with the orthographic projection of the respective one of the plurality of light extractors on the base substrate; and
the respective one of the plurality of photosensors is configured to detect light extracted from the respective one of the plurality of light extractors.

2. The microfluidic apparatus of claim 1, wherein the orthographic projections of the plurality of light extractors on the light guide plate are spaced apart from each other along a first direction and along a second direction, the second direction being different from the first direction; and
the plurality of light incident portions are spaced apart along the second direction.

3. The microfluidic apparatus of claim 2, wherein the respective one of the plurality of light extractors optically coupled to the respective one of the plurality of light sources of different colors is aligned with the respective one of the plurality of light sources of different colors along the first direction.

4. The microfluidic apparatus of claim 3, wherein an inter-portion distance between adjacent light incident portions of the plurality of light incident portions is greater than $1/6$ of a maximum distance between the respective one of the plurality of light extractors and the respective one of the plurality of light sources of different colors optically coupled together.

5. The microfluidic apparatus of claim 1, wherein the plurality of light extractors are on a surface of the light guide plate opposite to a surface of the light guide plate having the plurality of light incident portions.

6. The microfluidic apparatus of claim 1, wherein the light guide plate comprises a stacked structure comprising a plurality of light guide medium layers and one or more spacer layers, a respective one of the one or more spacer layers spacing apart adjacent light guide medium layers of the plurality of light guide medium layers;
a refractive index of a respective one of the plurality of light guide medium layers is greater than a refractive index of air and greater than a refractive index of the respective one of the one or more spacer layers; and
refractive indexes of the plurality of light guide medium layers are different from each other.

7. The microfluidic apparatus of claim 6, wherein the plurality of light guide medium layers comprises a first light guide medium layer and a second light guide medium layer;
the plurality of light extractors comprises a first light extractor on a side of the first light guide medium layer away from the plurality of light incident portions, the first light extractor being optically coupled with the first light guide medium layer, and configured to extract light incident from a first light source of a first wavelength range and totally reflected in the first light guide medium layer, to emit out of the first light guide medium layer;
remaining light extractors of the plurality of light extractors other than the first light extractor are on a side of the second light guide medium layer away from the plurality of light incident portions, the remaining light extractors being optically coupled with the second light guide medium layer, and configured to respectively extract light incident from remaining light sources of wavelength ranges different from the first wavelength range and totally reflected in the second light guide medium layer, to emit out of the second light guide medium layer.

8. The microfluidic apparatus of claim 6, wherein the respective one of the plurality of light extractors is optically coupled with a respective one of the light guide medium layers, and is configured to extract light incident from a respective one of the plurality of light sources of different colors and totally reflected in the respective one of the light guide medium layers, to emit out of the respective one of the light guide medium layers; and
the respective one of the plurality of light extractors is on a side of the respective one of the light guide medium layers away from the plurality of light incident portions.

9. The microfluidic apparatus of claim 8, wherein the plurality of light sources of different colors comprises a first light source emitting light of a first wavelength range, a second light source emitting light of a second wavelength range, and a third light source emitting light of a third wavelength range;
the plurality of light guide medium layers comprises a first light guide medium layer optically coupled with the first light source and configured to totally reflect light of the first wavelength range in the first light guide medium layer, a second light guide medium layer optically coupled with the second light source and configured to totally reflect light of the second wavelength range in the second light guide medium layer, and a third light guide medium layer optically coupled with the third light source and configured to totally reflect light of the third wavelength range in the third light guide medium layer; and the plurality of light extractors comprises a first light extractor on a side of the first light guide medium layer away from the plurality of light incident portions and optically coupled with the first light guide medium layer to extract light of the first wavelength range totally reflected in the first light guide medium layer, a second light extractor on a side of the second light guide medium layer away from the plurality of light incident portions and optically coupled with the second light guide medium layer to extract light of the second wavelength range totally reflected in the second light guide medium layer, and a third light extractor on a side of the third light guide medium layer away from the plurality of light incident portions and optically coupled with the third light guide medium layer to extract light of the third wavelength range totally reflected in the third light guide medium layer.

10. The microfluidic apparatus of claim 9, wherein the plurality of light incident portions comprises:

a first light incident portion optically coupled with the first light extractor, spaced apart from the first light extractor along a first direction, and configured to introduce light of the first wavelength range emitted from the first light source into the first light guide medium layer to be totally reflected therein;

a second light incident portion optically coupled with the second light extractor, and spaced apart from the second light extractor along the first direction, and configured to introduce light of the second wavelength range emitted from the second light source into the second light guide medium layer to be totally reflected therein; and a third light incident portion optically coupled with the third light extractor, spaced apart from the third light extractor along the first direction, and configured to introduce light of the third wavelength range emitted from the third light source into the third light guide medium layer to be totally reflected therein.

11. The microfluidic apparatus of claim 1, wherein the respective one of the plurality of light extractors is selected from a group consisting of a grating structure, diffuser dots, a wave filter, and a micro-mirror.

12. The microfluidic apparatus of claim 1, wherein wavelength ranges of light emitted respectively from the plurality of light sources of different colors do not overlap with each other.

13. The microfluidic apparatus of claim 1, wherein the microfluidic device further comprises a protective layer on a side of the plurality of micro fluidic channels closer to the light guide plate;

a first hydrophobic layer; and a second hydrophobic layer;

wherein the first hydrophobic layer and the second hydrophobic layer sandwich the plurality of micro fluidic channels;

the first hydrophobic layer is on a side of the protective layer away from the light guide plate; and the second hydrophobic layer is on a side of the base substrate away from the plurality of photosensors.

14. The microfluidic apparatus of claim 1, wherein the microfluidic device further comprises a plurality of reaction microchambers respectively in fluid communication with the plurality of micro fluidic channels; and an orthographic projection of a respective one of the plurality of reaction microchambers on the base substrate is between an orthographic projection of a respective one of the plurality of light incident portions on the base substrate and an orthographic projection of a respective one of the plurality of light extractors on the base substrate.

15. A method of detecting a substance in a microfluidic apparatus, comprising:

respectively emitting light of different wavelength ranges from a plurality of light sources of different colors into a plurality of light incident portions of a light guide plate;

respectively totally reflecting light of different wavelength ranges in the light guide plate;

respectively extracting light of different wavelength ranges from the light guide plate respectively using a plurality of light extractors on the light guide plate;

respectively irradiating light of different wavelength ranges extracted from the light guide plate onto a plurality of micro fluidic channels, a respective one of the plurality of micro fluidic channels being irradiated by a light of a respective one of the different wavelength ranges; and respectively detecting light respectively transmitting through the plurality of micro fluidic channels by a plurality of photosensors.

16. A light extraction apparatus, comprising:

a light guide plate having a plurality of light incident portions for respectively receiving light respectively incident from a plurality of light sources of different colors; and a plurality of light extractors on the light guide plate;

wherein a respective one of the plurality of light extractors is optically coupled with a respective one of the plurality of light sources of different colors, and is configured to extract light incident from a respective one of the plurality of light incident portions of the light guide plate and totally reflected in the light guide plate, to emit out of the light guide plate, light emitting out of the plurality of light extractors being of different wavelength ranges; and orthographic projections of the plurality of light extractors on the light guide plate are spaced apart from each other.

17. The light extraction apparatus of claim 16, wherein the orthographic projections of the plurality of light extractors on the light guide plate are spaced apart from each other along a first direction and along a second direction, the second direction being different from the first direction; and the plurality of light incident portions are spaced apart along the second direction.

18. The light extraction apparatus of claim 17, wherein the respective one of the plurality of light extractors optically coupled to the respective one of the plurality of light sources of different colors is aligned with the respective one of the plurality of light sources of different colors along the first direction.

19. The light extraction apparatus of claim 18, wherein an inter-portion distance between adjacent light incident portions of the plurality of light incident portions is greater than $1/6$ of a maximum distance between the respective one of the plurality of light extractors and the respective one of the plurality of light sources of different colors optically coupled together.

20. The light extraction apparatus of claim 16, wherein the plurality of light extractors are on a surface of the light guide plate opposite to a surface of the light guide plate having the plurality of light incident portions.

* * * * *